United States Patent
Ernesti et al.

(10) Patent No.: US 10,496,887 B2
(45) Date of Patent: Dec. 3, 2019

(54) DEVICE, SYSTEM AND METHOD FOR CONTROLLING A COMMUNICATION DEVICE TO PROVIDE ALERTS

(71) Applicant: MOTOROLA SOLUTIONS, INC., Chicago, IL (US)

(72) Inventors: Suzanne E. Ernesti, Gilbert, AZ (US); Jody A. Stowell, Lake in the Hills, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 22 days.

(21) Appl. No.: 15/902,626

(22) Filed: Feb. 22, 2018

(65) Prior Publication Data
US 2019/0258865 A1 Aug. 22, 2019

(51) Int. Cl.
*G06K 9/00* (2006.01)
*H04N 7/18* (2006.01)
*G08B 21/04* (2006.01)
*G06Q 50/26* (2012.01)

(52) U.S. Cl.
CPC ....... *G06K 9/00771* (2013.01); *G06Q 50/265* (2013.01); *G08B 21/0423* (2013.01); *H04N 7/188* (2013.01)

(58) Field of Classification Search
None
See application file for complete search history.

(56) References Cited

U.S. PATENT DOCUMENTS

| 9,952,046 B1* | 4/2018 | Blacutt ............... B60K 28/066 |
| 2007/0147625 A1 | 6/2007 | Shields et al. |
| 2011/0001619 A1* | 1/2011 | Danon ............... F41H 13/0031 340/540 |
| 2013/0057702 A1 | 3/2013 | Chavan |

(Continued)

FOREIGN PATENT DOCUMENTS

| GB | 2336978 A | 11/1999 |
| WO | WO-2018084725 A1 | 5/2018 |

OTHER PUBLICATIONS https://www.dailykos.com/stories/2015/6/3/1390285/-Shocking-new-video-shows-unarmed-Utah-man-was-listening-to-headphones-when-killed-by-police, by Shaun King (/user/Shaun@20King), Jun. 3, 2015.

(Continued)

*Primary Examiner* — Dakshesh D Parikh
(74) *Attorney, Agent, or Firm* — Perry + Currier, Inc.

(57) ABSTRACT

A device, system and method for controlling a communication device to provide alerts. One or more computing devices determine, using multimedia data received from one or more multimedia devices at a location of a commanding person, that an aural command has been directed from the commanding person to a target person. The one or more computing devices identify, using video data received from the one or more multimedia devices, one or more barriers to the target person hearing the aural command. The one or more computing devices determine, based on the one or more barriers that are identified using the video data, a likelihood that the target person has not heard the aural command. When the likelihood that the target person has not heard the aural command meets a threshold condition, the one or more computing devices cause a communication device associated with the commanding person to provide an alert.

20 Claims, 11 Drawing Sheets

(56) References Cited

U.S. PATENT DOCUMENTS

| | | |
|---|---|---|
| 2013/0282609 A1 | 10/2013 | Au et al. |
| 2014/0126728 A1 | 5/2014 | Van Der Schaar et al. |
| 2014/0152530 A1 | 6/2014 | Venkatesha et al. |
| 2015/0019212 A1 | 1/2015 | Nongpiur |
| 2016/0004913 A1 | 1/2016 | Park |
| 2017/0032638 A1 | 2/2017 | Xie et al. |
| 2017/0054904 A1* | 2/2017 | Li ................. H04N 5/23238 |

OTHER PUBLICATIONS

UKIPO, Search Report under Section 17, Aug. 19, 2019, re UK Patent Application No. GB1902322.5.

* cited by examiner

US 10,496,887 B2

DEVICE, SYSTEM AND METHOD FOR CONTROLLING A COMMUNICATION DEVICE TO PROVIDE ALERTS

BACKGROUND OF THE INVENTION

First responders, such as police officers, generally attempt to communicate with persons of interest by issuing verbal commands and the like (e.g. "Stop", "We need to speak with you" etc.). However, in such situations, some persons of interest may not hear the commands due to barriers to hearing sound, such as headphones being worn by a person of interest, machines in the area emitting noise, etc. Either way, the commands may not be followed by some people, which may make public safety incidents worse and/or may cause a public safety situation to escalate and/or may lead to a waste of technical resources when the police officer calls in backup to assist with the person of interest.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
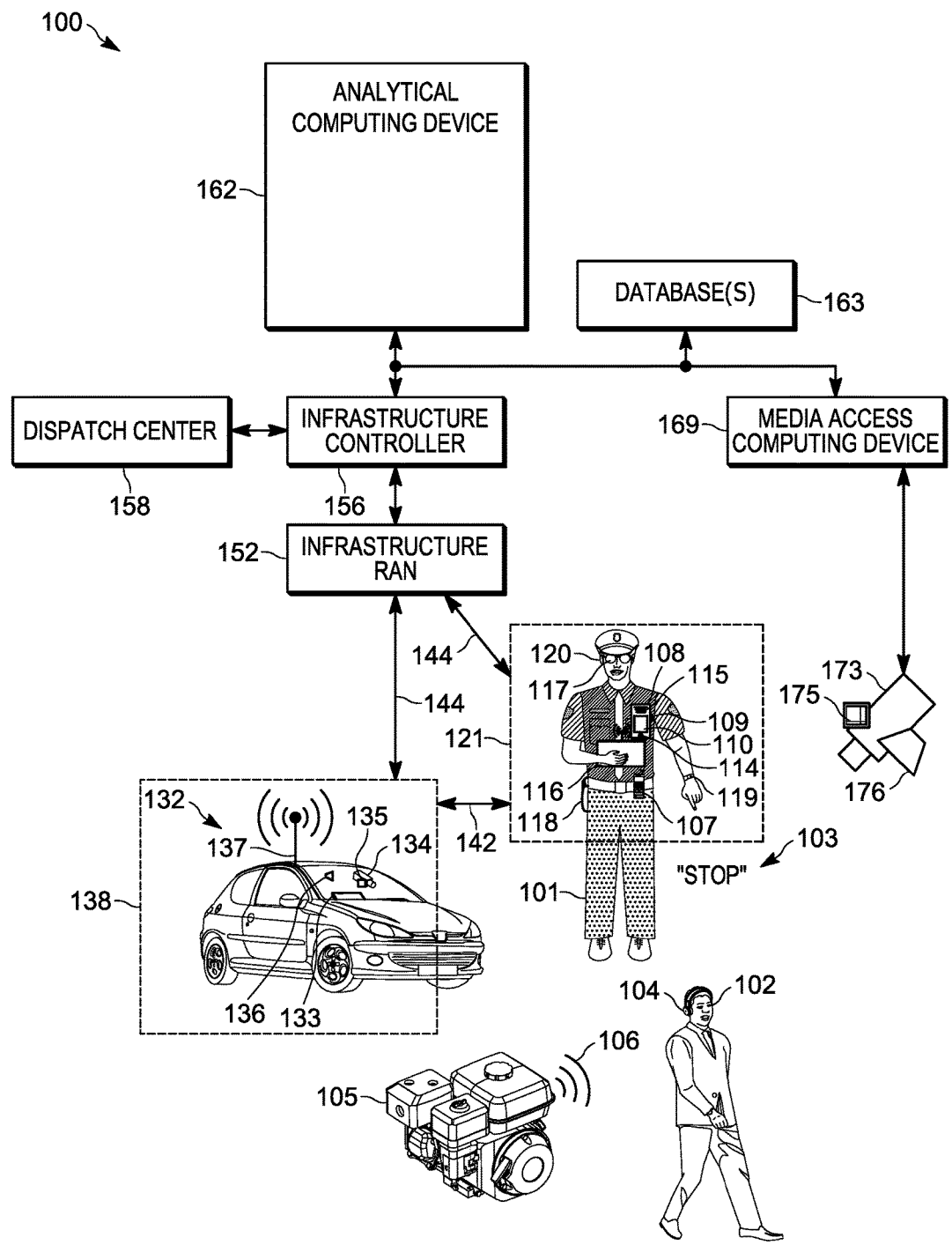
FIG. 1 is a system for controlling a communication device to provide alerts and further depicts an aural command being detected at a location in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

An aspect of the specification provides a method comprising: determining, at one or more computing devices, using multimedia data received from one or more multimedia devices at a location of a commanding person, that an aural command has been directed from the commanding person to a target person; identifying, at the one or more computing devices, using video data received from the one or more multimedia devices, one or more barriers to the target person hearing the aural command; determining, at the one or more computing devices, based on the one or more barriers that are identified using the video data, a likelihood that the target person has not heard the aural command; and when the likelihood that the target person has not heard the aural command meets a threshold condition, causing, via the one or more computing devices, a communication device associated with the commanding person to provide an alert.

Another aspect of the specification provides a device comprising: a controller communicatively coupled to a communications unit, the controller configured to: determine, using multimedia data received, via the communications unit, from one or more multimedia devices at a location of a commanding person, that an aural command has been directed from the commanding person to a target person; identify, using video data received, via the communications unit, from the one or more multimedia devices, one or more barriers to the target person hearing the aural command; determine, based on the one or more barriers that are identified using the video data, a likelihood that the target person has not heard the aural command; and when the likelihood that the target person has not heard the aural command meets a threshold condition, cause a communication device associated with the commanding person to provide an alert.

Attention is directed to FIG. 1, which depicts a system 100 for controlling a communication device to provide alerts, for example at a location where a commanding person 101, such as a police officer, is verbally attempting to communicate with a target person 102. For example, as depicted, the commanding person 101 is directing an aural command 103 to the target person 102 to tell the target person 102 to "STOP". As depicted, the commanding person 101 may further gesture towards the target person 102, for example by pointing towards the target person 102. As depicted, however, the target person 102 is wearing headphones 104, and a generator 105 is emitting sound 106, each of which act as a barrier to the target person 102 hearing the aural command 103. Furthermore, the target person 102 is facing away from the commanding person 101 (e.g. the target person 102 may be walking away from the commanding person 101) and hence does not see gestures by the commanding person 101. As such, the target person 102 does not hear the aural command 103 and hence does not follow the aural command; the commanding person 101 may be attempting to communicate with the target person 102 as part of a public safety incident, and the like, and the target person 102 not hearing the aural command 103 may cause the public safety incident to escalate. For example, the target person 102 may be a suspect and/or a person of interest and/or may be a bystander headed towards a dangerous public safety incident and the like. As described herein, the system 100 is generally configured to determine when the likelihood that the target person 102 has not heard the aural command meets a threshold condition and cause a communication device associated with the commanding person 101 to provide an alert thereof, Such an alert may cause the commanding person 101 to take further action to communicate with the target person 102 in a manner that does not cause the public safety incident to escalate and/or reduces the use of technical resources in the system 100, for example, by preventing the commanding person 101 from using radios and the like to call in additional public safety resources as backup and/or to deal with the target person 102.

The system 100 is next described in further detail. As depicted, the system 100 includes a first set of devices that the commanding person 101 may wear, such as a primary battery-powered portable radio 107 used for narrowband and/or broadband direct-mode or infrastructure communications, a battery-powered radio speaker microphone (RSM) video capture device 108 (which includes a push-to-talk (PTT) switch 109, a display screen 110 and a video camera 114 and a microphone 115 (which is assumed to be a component of a speaker/microphone assembly). As depicted, the first set of devices that the commanding person 101 may wear includes a laptop 116 which may include an integrated video camera and/or microphone and/or speaker and used for data applications such as incident support applications. As depicted the first set of devices that the commanding person 101 may wear includes smart glasses 117 (e.g. which may be virtual reality, augmented reality, or mixed reality glasses and which may include an integrated video camera and/or microphone and/or speaker), a sensor-enabled holster 118, and/or a biometric sensor wristband 119 and/or a headphone 120.

The portable radio 107, the RSM video capture device 108, the laptop 116, smart glasses 117, the sensor-enabled holster 118, and/or the biometric sensor wristband 119 and/or the headphone 120 may form a personal area network (PAN) 121 of the commanding person 101 via corresponding short-range PAN transceivers, which may be based on a Bluetooth™, Zigbee™, or other short-range wireless protocol having a transmission range on the order of meters, tens of meters, or hundreds of meters.

Although FIG. 1 illustrates only a single commanding person 101 with a respective first set of devices, in other embodiments, the commanding person 101 may include additional sets of same or similar devices, and additional persons and/or first responders may be present with respective additional sets of same or similar devices (wherein communication devices of the commanding person 101 and the additional users may form a talkgroup of related users).

The system 100 may also include a vehicle 132 associated with the commanding person 101 having an integrated mobile communication device 133, an associated vehicular video camera 134, and/or an associated microphone 135 (which may be a component of the video camera 134 or a component separate from the video camera 134), a speaker 136 and a coupled vehicular transceiver 137 which may form a vehicle area network (VAN) 138.

Although FIG. 1 illustrates only a single vehicle 132 with a single mobile communication device 133, respective single vehicular video camera 134 and/or microphone 135, and single coupled vehicular transceiver 137, in other embodiments, the vehicle 132 may include additional same or similar mobile communication devices, video cameras, microphones, speakers, and/or transceivers, and additional vehicles may be present with respective additional sets of mobile communication devices, video cameras, speakers, microphones, and/or transceivers.

Each of the portable radio 107, the RSM video capture device 108, the laptop 116, and/or the PAN 121 and the vehicular mobile communication device 133 and/or the VAN 138 may be configured for directly wirelessly communicating via direct-mode wireless link(s) 142, and/or may be configured for wirelessly communicating over respective wireless link(s) 144 via a wireless infrastructure radio access network (RAN) 152 (described in more detail below) and via corresponding transceiver circuits. These devices may be referred to as communication devices and are configured to receive inputs associated with the commanding person 101 and/or provide outputs to the commanding person 101 in addition to communicating information to and from other communication devices and the infrastructure RAN 152.

The portable radio 107, in particular, may be any communication device used for infrastructure RAN or direct-mode media (e.g., voice, audio, video, etc.) communication via a long-range wireless transmitter and/or transceiver that has a transmitter transmit range on the order of miles, e.g., 0.5-50 miles, or 3-20 miles (i.e., long-range in comparison to a short-range transmitter such as a Bluetooth™ Zigbee™, or NFC (near field communication) transmitter) with other communication devices and/or an infrastructure RAN. The long-range transmitter may implement a direct-mode, conventional, or trunked land mobile radio (LMR) standard or protocol such as European Telecommunications Standards Institute (ETSI) Digital Mobile Radio (DMR), a Project 25 (P25) standard defined by the Association of Public Safety Communications Officials International (APCO), Terrestrial Trunked Radio (TETRA), or other LMR radio protocols or standards. In other embodiments, the long range transmitter may implement a Long Term Evolution (LTE), LTE-Advance, or 5G protocol including multimedia broadcast multicast services (MBMS) or single site point-to-multipoint (SC-PTM) over which an open mobile alliance (OMA) push to talk (PTT) over cellular (OMA-PoC), a voice over IP (VoIP), an LTE Direct or LTE Device to Device, or a PTT over IP (PoIP) application may be implemented. In still further embodiments, the long range transmitter may implement a Wi-Fi protocol, for example in accordance with an IEEE 802.11 standard (e.g., 802.11a, 802.11b, 802.11g) or a WiMAX (Worldwide Interoperability for Microwave Access) protocol, for example operating in accordance with an IEEE 802.16 standard.

In the example of FIG. 1, the portable radio 107 may form the hub of communication connectivity for the commanding person 101, through which other accessory devices, such as a biometric sensor (for example, the biometric sensor wristband 119), an activity tracker, a weapon status sensor (for example, the sensor-enabled holster 118), a heads-up-display (for example, the smart glasses 117), the RSM video capture device 108, and/or the laptop 116 and/or the headphone 120 may be communicatively coupled. In other words, the portable radio 107 may form the hub of the PAN 121.

In order to communicate with and exchange video, audio, and other media and communications with the RSM video capture device 108, laptop 116, and/or smart glasses 117 and/or headphone 120, the portable radio 107 may contain one or more physical electronic ports (such as a USB (Universal Serial Bus) port, an Ethernet port, an audio jack, etc.) for direct electronic coupling with the RSM video capture device 108, laptop 116, and/or smart glasses 117 and/or headphone 120. In some embodiments, the portable radio 107 may contain a short-range transmitter (i.e., short-range in comparison to the long-range transmitter such as a LMR or broadband transmitter) and/or transceiver for wirelessly coupling with the RSM video capture device 108, laptop 116, and/or smart glasses 117 and/or headphone 120. The short-range transmitter may be a Bluetooth™, Zigbee™, or NFC transmitter having a transmit range on the order of 0.01-100 meters, or 0.1-10 meters. In other embodiments, the RSM video capture device 108, the laptop 116, and/or the smart glasses 117 and/or headphone 120 may contain their own long-range transceivers and may communicate with one another and/or with the infrastructure RAN 152 or vehicular transceiver 137 directly without passing through portable radio 107.

The RSM video capture device 108 provides voice functionality features similar to a traditional RSM, including one or more of acting as a remote microphone (e.g. via the microphone 115) that is closer to the mouth of the commanding person 101, providing a remote speaker (e.g. integrated with the microphone 115) allowing playback of audio closer to the ear of the commanding person 101, and including the PTT switch 109 or other type of PTT input. The voice and/or audio recorded at the remote microphone 115 may be provided to the portable radio 107 for storage and/or analysis or for further transmission to other mobile communication devices or the infrastructure RAN 152, or may be directly transmitted by the RSM video capture device 108 to other communication devices or to the infrastructure RAN 152. The voice and/or audio played back at the remote speaker may be received from the portable radio 107 or received directly from one or more other communication devices or the infrastructure RAN 152. The RSM video capture device 108 may include the separate physical PTT switch 109 that functions, in cooperation with the portable radio 107 or on its own, to maintain the portable radio 107 and/or RSM video capture device 108 in a monitor only mode, and which switches the device(s) to a transmit-only mode (for half-duplex devices) or transmit and receive mode (for full-duplex devices) upon depression or activation of the PTT switch 109. The portable radio 107 and/or RSM video capture device 108 may form part of a group communications architecture that allows a single communication device to communicate with one or more group members (i.e., talkgroup members not shown in FIG. 1) associated with a particular group of devices at a same time.

Additional features may be provided at the RSM video capture device 108 as well. For example, as depicted, the display screen 110 may be provided for displaying images, video, and/or text to the commanding person 101 or to someone else. The display screen 110 may be, for example, a liquid crystal display (LCD) screen or an organic light emitting display (OLED) display screen, and the like. In some embodiments, a touch sensitive input interface may be incorporated into the display screen 110 as well, allowing the commanding person 101 to interact with content provided on the display screen 110. However, the display screen 110 may be optional. A soft PTT input may also be provided, for example, via such a touch interface.

The video camera 114 may also be provided at the RSM video capture device 108, integrating an ability to capture images and/or video and store the captured image data (for further analysis) or transmit the captured image data as an image or video stream to the portable radio 107 and/or to other communication devices or to the infrastructure RAN 152 directly. The video camera 114 and RSM remote microphone 115 may be used, for example, for capturing audio and/or video of a field-of-view associated with the commanding person 101, which may include the target person 102 and/or surroundings of a target person 102, storing the captured image and/or audio data for further analysis or transmitting the captured audio and/or video data as an audio and/or vide stream to the portable radio 107 and/or to other communication devices or to the infrastructure RAN 152 directly for further analysis. The microphone 115 of the RSM video capture device 108 may be an omni-directional or unidirectional microphone or array of omni-directional or unidirectional microphones that may configured for identifying a direction from which a captured sound emanated.

In some embodiments, the RSM video capture device 108 may be replaced with a more limited body worn camera that may include the video camera 114 and/or microphone 115 noted above for capturing audio and/or video, but may forego one or more of the features noted above that transform the body worn camera into a more full featured RSM, such as the separate physical PTT switch 109 and the display screen 110, remote microphone functionality for voice communications in cooperation with portable radio 107, and remote speaker.

The laptop 116, in particular, may be any wireless communication device used for infrastructure RAN or direct-mode media communication via a long-range or short-range wireless transmitter with other communication devices and/or the infrastructure RAN 152. The laptop 116 includes a display screen for displaying a user interface to an operating system and one or more applications running on the operating system, such as a broadband PTT communications application, a web browser application, a vehicle history database application, a workflow application, a forms or reporting tool application, an arrest record database application, an outstanding warrant database application, a mapping and/or navigation application, a health information database application, and/or other types of applications that may require user interaction to operate. The laptop 116 display screen may be, for example, an LCD screen or an OLED display screen, and the like. In some embodiments, a touch sensitive input interface may be incorporated into the display screen as well, allowing the commanding person 101 to interact with content provided on the display screen. A soft PTT input may also be provided, for example, via such a touch interface. However, the laptop 116 may be optional as carrying a laptop during a public safety incident may be challenging for the commanding person 101.

Front and/or rear-facing video cameras (not depicted), as well as one or more microphones) may also be provided at the laptop 116, integrating an ability to capture video and/or audio of the commanding person 101 and surroundings, which may include a field-of-view of the commanding person 101 and/or a suspect (or potential suspect, such as the target person 102) and the suspect's surroundings, and store and/or otherwise process the captured video and/or audio for further analysis or transmit the captured video and/or audio as a video and/or audio stream to the portable radio 107, other communication devices, and/or the infrastructure RAN 152 for further analysis.

The headphone 120 may comprise an in-ear or over-the ear earpiece and may be present for providing audio to the commanding person 101 in a private fashion that is not accessible to other users nearby the commanding person 101. The headphone 120 may be wiredly or wirelessly communicatively coupled to one or both of the RSM video capture device 108 and the portable radio 107, which may be configured to provide audio received from the RAN and/or from other users to the commanding person 101 based on a manual configuration of the RSM video capture device 108 or the portable radio 107, or based on some automatic routing mechanism at the one of the RSM video capture device 108 and the portable radio 107 that may route all audio to the earpiece or headphone 120 whenever it is detected as connected to the one of the RSM video capture device 108 and the portable radio 107, or may selectively route audio received at the one of the RSM video capture device 108 and the portable radio 107 to the earpiece or headphone 120 based on various contextual parameters, such as a content of the received audio, an identity of who sent the received audio, a covert status of the commanding person 101, an incident status of the commanding person 101, a determination of nearby users associated with the commanding person 101, or some other contextual parameter.

The smart glasses 117 may include a digital imaging device, an electronic processor, a short-range and/or long-range transceiver device, and/or a projecting device and/or one or more microphones. The smart glasses 117 may maintain a bi-directional connection with the portable radio 107 and provide an always-on or on-demand video feed pointed in a direction of a gaze of the commanding person 101 via the digital imaging device, and/or may provide a personal display via the projection device integrated into the smart glasses 117 for displaying information such as text, images, or video received from the portable radio 107 or directly from the infrastructure RAN 152. In some embodiments, the smart glasses 117 may include its own long-range transceiver and may communicate with other communication devices and/or with the infrastructure RAN 152 or vehicular transceiver 137 directly without passing through portable radio 107. In other embodiments, an additional user interface mechanism such as a touch interface or gesture detection mechanism may be provided at the smart glasses 117 that allows the commanding person 101 to interact with the display elements displayed on the smart glasses 117 or projected into the eyes of the commanding person 101, or to modify operation of the digital imaging device. In still other embodiments, a display and input interface at the portable radio 107 may be provided for interacting with smart glasses 117 content and modifying operation of the digital imaging device, among other possibilities.

The smart glasses 117 may provide a virtual reality interface in which a computer-simulated reality electronically replicates an environment with which the commanding person 101 may interact. In some embodiments, the smart glasses 117 may provide an augmented reality interface in which a direct or indirect view of real-world environments in which the user is currently disposed are augmented (i.e., supplemented, by additional computer-generated sensory input such as sound, video, images, graphics, GPS data, or other information). In still other embodiments, the smart glasses 117 may provide a mixed reality interface in which electronically generated objects are inserted in a direct or indirect view of real-world environments in a manner such that they may co-exist and interact in real time with the real-world environment and real-world objects.

The sensor-enabled holster 118 may be an active (powered) or passive (non-powered) sensor that maintains and/or provides state information regarding a weapon or other item normally disposed within the sensor-enabled holster 118. The sensor-enabled holster 118 may detect a change in state (presence to absence) and/or an action (removal) relative to the weapon normally disposed within the sensor-enabled holster 118. The detected change in state and/or action may be reported to the portable radio 107 via its short-range transceiver. In some embodiments, the sensor-enabled holster 118 may also detect whether the first responder's hand is resting on the weapon even if it has not yet been removed from the holster and provide such information to portable radio 107. Other possibilities exist as well.

The biometric sensor wristband 119 may be an electronic device for tracking an activity of the commanding person 101 or a health status of the commanding person 101, and may include one or more movement sensors (such as an accelerometer, magnetometer, and/or gyroscope) that may periodically or intermittently provide to the portable radio 107 indications of orientation, direction, steps, acceleration, and/or speed, and indications of health such as one or more of a captured heart rate, a captured breathing rate, and a captured body temperature of the commanding person 101, which may accompany other information. In some embodiments, the biometric sensor wristband 119 may include its own long-range transceiver and may communicate with other communication devices and/or with the infrastructure RAN 152 or vehicular transceiver 137 directly without passing through portable radio 107.

An accelerometer is a device that measures acceleration. Single and multi-axis models are available to detect magnitude and direction of the acceleration as a vector quantity, and may be used to sense orientation, acceleration, vibration shock, and falling. A gyroscope is a device for measuring or maintaining orientation, based on the principles of conservation of angular momentum. One type of gyroscope, a microelectromechanical system (MEMS) based gyroscope, uses lithographically constructed versions of one or more of a tuning fork, a vibrating wheel, or resonant solid to measure orientation. Other types of gyroscopes could be used as well. A magnetometer is a device used to measure the strength and/or direction of the magnetic field in the vicinity of the device, and may be used to determine a direction in which a person or device is facing.

The heart rate sensor may use electrical contacts with the skin to monitor an electrocardiography (EKG) signal of its wearer, or may use infrared light and imaging device to optically detect a pulse rate of its wearer, among other possibilities.

A breathing rate sensor may be integrated within the sensor wristband 119 itself, or disposed separately and communicate with the sensor wristband 119 via a short range wireless or wired connection. The breathing rate sensor may include use of a differential capacitive circuits or capacitive transducers to measure chest displacement and thus breathing rates. In other embodiments, a breathing sensor may monitor a periodicity of mouth and/or nose-exhaled air (e.g., using a humidity sensor, temperature sensor, capnometer or spirometer) to detect a respiration rate. Other possibilities exist as well.

A body temperature sensor may include an electronic digital or analog sensor that measures a skin temperature using, for example, a negative temperature coefficient (NTC) thermistor or a resistive temperature detector (RTD), may include an infrared thermal scanner module, and/or may include an ingestible temperature sensor that transmits an internally measured body temperature via a short range wireless connection, among other possibilities.

Although the biometric sensor wristband 119 is shown in FIG. 1 as a bracelet worn around the wrist, in other examples, the biometric sensor wristband 119 may additionally and/or alternatively be worn around another part of the body, or may take a different physical form including an earring, a finger ring, a necklace, a glove, a belt, or some other type of wearable, ingestible, or insertable form factor.

The portable radio 107 and/or RSM video capture device 108 (or any other electronic device in FIG. 1, for that matter) may each include a location determination device integrated with or separately disposed in the portable radio 107 and/or RSM video capture device 108 and/or in respective receivers, transmitters, or transceivers of the portable radio 107 and RSM video capture device 108 for determining a location of the portable radio 107 and RSM video capture device 108. The location determination device may be, for example, a global positioning system (GPS) receiver or wireless triangulation logic using a wireless receiver or transceiver and a plurality of wireless signals received at the wireless receiver or transceiver from different locations, among other possibilities. The location determination device may also include an orientation sensor for determining an orientation that the device is facing. Each orientation sensor may include a gyroscope and/or a magnetometer. Other types of orientation sensors could be used as well. The location may then be stored locally or transmitted via the transmitter or transceiver to other communication devices and/or to the infrastructure RAN 152.

The vehicle 132 associated with the commanding person 101 may include the mobile communication device 133, the vehicular video camera 134 and/or microphone 135, and the vehicular transceiver 137, all of which may be coupled to one another via a wired and/or wireless VAN 138 (and/or with any other further sensors physically or communicatively coupled to the vehicle 132). The vehicular transceiver 137 may include a long-range transceiver for directly wirelessly communicating with communication devices such as the portable radio 107, the RSM video capture device 108, and the laptop 116 via wireless link(s) 142 and/or for wirelessly communicating with the RAN via wireless link(s) 144. The vehicular transceiver 137 may further include a short-range wireless transceiver or wired transceiver for communicatively coupling between the mobile communication device 133 and/or the vehicular video camera 134 and/or the microphone 135 in the VAN 138. The mobile communication device 133 may, in some embodiments, include the vehicular transceiver 137 and/or the vehicular video camera 134 and/or the microphone 135 integrated therewith, and may operate to store and/or process video and/or audio produced by the video camera 134 and/or transmit the captured video and/or audio as a video and/or audio stream to the portable radio 107, other communication devices, and/or an infrastructure RAN 152 (described below) for further analysis. The microphone 135 may comprise an omni-directional or unidirectional microphone 135, or an array thereof, may be integrated in the video camera 134 and/or at the mobile communication device 133 (or additionally or alternatively made available at a separate location of the vehicle 132) and communicably coupled to the mobile communication device 133 and/or vehicular transceiver 137 for capturing audio and storing, processing, and/or transmitting the audio in a same or similar manner as set forth above with respect to the RSM video capture device 108.

Although FIG. 1 illustrates the vehicular video camera 134 and microphone 135 as being placed inside the vehicle 132, in other embodiments, one or both of the vehicular video camera 134 and microphone 135 may be placed at visible or hidden locations outside of the vehicle 132, such as within a vehicular grill portion or bumper portion, or on a roof portion, of the vehicle 132. Further, although FIG. 1 illustrates the speaker 136 as being placed inside of the vehicle 132 and coupled to the mobile communication device 133, in other embodiments, multiple speakers may be provided inside and/or outside of the vehicle 132 (all addressed simultaneously or individually addressable for outputting separate audio streams), or the single speaker 136 may be placed outside of the vehicle and function as a PA speaker, among other possibilities.

The vehicle 132 may be a human-operable vehicle, or may be a self-driving vehicle operable under control of mobile communication device 133 and optionally in cooperation with video camera 134 (which may include a visible-light camera, an infrared camera, a time-of-flight depth camera, and/or a light detection and ranging (LiDAR) device). Command information and/or status information such as location and speed may be exchanged with the self-driving vehicle via the VAN 138 and/or the PAN (when the PAN is in range of the VAN 138 or via infrastructure RAN link of the VAN 138).

The vehicle 132 and/or transceiver 137, similar to the portable radio 107 and/or respective receivers, transmitters, or transceivers thereof, may include a location (and/or orientation) determination device integrated with or separately disposed in the mobile communication device 133 and/or transceiver 137 for determining (and storing and/or transmitting) a location (and/or orientation) of the vehicle 132.

In some embodiments, instead of a vehicle 132, a land, air, or water-based drone with the same or similar audio and/or video and communications capabilities and the same or similar self-navigating capabilities as set forth above may be disposed, and may similarly communicate with the PAN 121 and/or with the infrastructure RAN 152 to support the commanding person 101 in the field.

The VAN 138 may communicatively couple with the PAN 121, disclosed above, when the VAN 138 and the PAN 121 come within wireless transmission range of one another, which may include an authentication that takes place there between. In some embodiments, one of the VAN 138 and the PAN 121 may provide infrastructure communications to the other, depending on the situation and the types of devices in the VAN 138 and/or PAN 121 and may provide interoperability and communication links between devices (such as video cameras and sensors) within the VAN 138 and PAN 121.

The infrastructure RAN 152 comprises a radio access network that provides for radio communication links to be arranged within the network between a plurality of user terminals. Such user terminals may be portable, mobile, or stationary and may include any one or more of the communication devices illustrated in FIG. 1, among other possibilities. At least one other terminal, e.g. used in conjunction with the communication devices, may be a fixed terminal, e.g. a base station, eNodeB, repeater, and/or access point. Such an infrastructure RAN typically includes a system infrastructure that generally includes a network of various fixed terminals, such as antennas and the like, which are in direct radio communication with the communication devices. Each of the fixed terminals operating in the RAN may have one or more transceivers which may, for example, serve communication devices in a given region or area, known as a 'cell' or 'site', by radio frequency (RF) communication. The communication devices that are in direct communication with a particular fixed terminal are said to be served by the fixed terminal. In one example, all radio communications to and from each communication device within the RAN are made via respective serving fixed terminals. Sites of neighboring fixed terminals may be offset from one another and may provide corresponding non-overlapping or partially or fully overlapping RF coverage areas.

The infrastructure RAN 152 may operate according to an industry standard wireless access technology such as, for example, an LTE, LTE-Advance, or 5G technology over which an OMA-PoC, a VoIP, an LTE Direct or LTE Device to Device, or a PoIP application may be implemented. Additionally, or alternatively, the infrastructure RAN 152 may implement a WLAN technology such as Wi-Fi, for example operating in accordance with an IEEE 802.11 standard (e.g., 802.11a, 802.11b, 802.11g) or such as a WiMAX, for example operating in accordance with an IEEE 802.16 standard.

The infrastructure RAN 152 may additionally, or alternatively, operate according to an industry standard LMR wireless access technology such as, for example, the P25 standard defined by the APCO, the TETRA standard defined by the ETSI, the dPMR standard also defined by the ETSI, or the DMR standard also defined by the ETSI. Because these systems generally provide lower throughput than the broadband systems, they are sometimes designated as narrowband RANs.

Communications in accordance with any one or more of these protocols or standards, or other protocols or standards, may take place over physical channels in accordance with one or more of a TDMA (time division multiple access), FDMA (frequency divisional multiple access), OFDMA (orthogonal frequency division multiplexing access), or CDMA (code division multiple access) technique.

OMA-PoC, in particular and as one example of an infrastructure broadband wireless application, enables familiar PTT and "instant on" features of traditional half duplex communication devices, but uses communication devices operating over modern broadband telecommunications networks. Using OMA-PoC, wireless communication devices such as mobile telephones and notebook computers can function as PTT half-duplex communication devices for transmitting and receiving. Other types of PTT models and multimedia call models (MMCMs) are also available.

Floor control in an OMA-PoC session is generally maintained by a PTT server that controls communications between two or more wireless communication devices. When a user of one of the communication devices keys a PTT button, a request for permission to speak in the OMA-PoC session is transmitted from the user's communication device to the PTT server using, for example, a real-time transport protocol (RTP) message. If no other users are currently speaking in the PoC session, an acceptance message is transmitted back to the user's communication device and the user may then speak into a microphone of the communication device. Using standard compression/decompression (codec) techniques, the user's voice is digitized and transmitted using discrete auditory data packets (e.g., together which form an auditory data stream over time), such as according to RTP and internet protocols (IP), to the PTT server. The PTT server then transmits the auditory data packets to other users of the PoC session (e.g., to other communication devices in the group of communication devices or talkgroup to which the user is subscribed), using for example, one or more of a unicast, point to multipoint, or broadcast communication technique.

Infrastructure narrowband LMR wireless systems, on the other hand, operate in either a conventional or trunked configuration. In either configuration, a plurality of communication devices is partitioned into separate groups of communication devices. In a conventional narrowband system, each communication device in a group is selected to a particular radio channel (frequency or frequency & time slot) for communications associated with that communication device's group. Thus, each group is served by one channel, and multiple groups may share the same single frequency or frequency & time slot (in which case, in some embodiments, group IDs may be present in the group data to distinguish between groups).

In contrast, a trunked radio system and its communication devices use a pool of traffic channels for virtually an unlimited number of groups of communication devices (and which may also be referred to herein as talkgroups). Thus, all groups are served by all channels. The trunked radio system works to take advantage of the probability that not all groups need a traffic channel for communication at the same time. When a member of a group requests a call on a control or rest channel on which all of the communication devices at a site idle awaiting new call notifications, in one embodiment, a call controller assigns a separate traffic channel for the requested group call, and all group members move from the assigned control or rest channel to the assigned traffic channel for the group call. In another embodiment, when a member of a group requests a call on a control or rest channel, the call controller may convert the control or rest channel on which the communication devices were idling to a traffic channel for the call, and instruct all communication devices that are not participating in the new call to move to a newly assigned control or rest channel selected from the pool of available channels. With a given number of channels, a much greater number of groups may be accommodated in a trunked radio system as compared with a conventional radio system.

Group calls may be made between wireless and/or wireline participants in accordance with either a narrowband or a broadband protocol or standard. Group members for group calls may be statically or dynamically defined. That is, in a first example, a user or administrator working on behalf of the user may indicate to the switching and/or radio network (for example, at a call controller, PTT server, zone controller, or mobile management entity (MME), base station controller (BSC), mobile switching center (MSC), site controller, Push-to-Talk controller, or other network device) a list of participants of a group at the time of the call or in advance of the call. The group members (e.g., communication devices) could be provisioned in the network by the user or an agent, and then provided some form of group identity or identifier, for example. Then, at a future time, an originating user in a group may cause some signaling to be transmitted indicating that he or she wishes to establish a communication session (e.g., group call) with each of the pre-designated participants in the defined group. In another example, communication devices may dynamically affiliate with a group (and also disassociate with the group) for example based on user input, and the switching and/or radio network may track group membership and route new group calls according to the current group membership.

In some instances, broadband and narrowband systems may be interfaced via a middleware system that translates between a narrowband PTT standard protocol (such as P25) and a broadband PTT standard protocol or application (such as OMA-PoC). Such intermediate middleware may include a middleware server for performing the translations and may be disposed in the cloud, disposed in a dedicated on-premises location for a client wishing to use both technologies, or disposed at a public carrier supporting one or both technologies. For example, and with respect to FIG. 1, such a middleware server may be disposed in the infrastructure RAN 152, at the infrastructure controller 156 or at a separate cloud computing cluster (not depicted) communicably coupled to the infrastructure controller 156 via an internet protocol (IP) network (not depicted), among other possibilities.

The infrastructure RAN 152 is illustrated in FIG. 1 as providing coverage for the PAN 121 and/or the portable radio 107, the RSM video capture device 108, the laptop 116, the smart glasses 117, and/or the vehicle transceiver 137 and/or the VAN 138. In general, the infrastructure RAN 152 communicatively couples the PAN 121 and/or the portable radio 107, the RSM video capture device 108, the laptop 116, the smart glasses 117, and/or the vehicle transceiver 137 and/or the VAN 138 to a single infrastructure controller 156, which is in turn in communication with a dispatch center 158 which include one or more dispatch terminals operated by one or more dispatchers. The infrastructure controller 156 further couples the PAN 121 and/or the portable radio 107, the RSM video capture device 108, the laptop 116, the smart glasses 117, and/or the vehicle transceiver 137 and/or the VAN 138 to an analytical computing device 162, for example via an internet protocol (IP) network (not depicted), and the like.

For example, infrastructure RAN 152 may include one or more fixed antennas, fixed terminals, and the like (not depicted) which couple the infrastructure RAN 152 to the infrastructure controller 156 (e.g., a radio controller, call controller, PTT server, zone controller, MME, BSC, MSC, site controller, Push-to-Talk controller, or other network device) the dispatch center 158 and the analytical computing device 162. In other embodiments, a plurality of fixed antennas and/or terminals and additional controllers may be disposed to support a larger geographic footprint and/or a larger number of mobile devices.

The infrastructure controller 156 illustrated in FIG. 1, or some other back-end infrastructure device or combination of back-end infrastructure devices existing on-premises or in a remote cloud compute cluster accessible via an IP network (such as the Internet), may additionally or alternatively operate as a back-end electronic digital assistant, a back-end audio and/or video processing device, and/or a remote cloud-based storage device consistent with the remainder of this disclosure.

It is assumed in FIG. 1 that an IP network is present which couples the infrastructure controller 156 to the analytical computing device 162, as well as a database(s) 163 and/or a media access computing device 169 described in more detail below. Such an IP network may comprise one or more routers, switches, LANs, WLANs, WANs, access points, or other network infrastructure, including but not limited to, the public Internet.

The analytical computing device 162 may comprise of a plurality of computing devices in a cloud compute cluster arrangement, one or more of which may be executing none, all, or a portion of an electronic digital assistant service, sequentially or in parallel, across the one or more computing devices. The one or more computing devices comprising the analytical computing device 162 may be geographically co-located or may be separated by inches, meters, kilometers or miles, and inter-connected via electronic and/or optical interconnects. Although not shown in FIG. 1, one or more proxy servers or load balancing servers may control which one or more computing devices perform any part or all of the electronic digital assistant service.

As depicted, the system 100 may further comprise the database(s) 163 may be accessible via an IP network and/or the analytical computing device 162, and may include databases such as a long-term video storage database, a historical or forecasted weather database, an offender database which may include, but is not limited to, facial recognition images to match against, a cartographic database of streets and elevations, a traffic database of historical or current traffic conditions, or other types of databases. The databases 163 may further include all or a portion of the databases described herein as being provided at infrastructure controller 156. In some embodiments, the databases 163 may be maintained by third parties (for example, the National Weather Service or a Department of Transportation, respectively). As shown in FIG. 1, the databases 163 may be communicatively coupled with the infrastructure RAN 152 (e.g. via an IP network) to allow communication devices (for example, the portable radio 107, the RSM video capture device 108, the laptop 116, and the mobile communication device 133) to communicate with and retrieve data from the databases 163 via the infrastructure controller 156. In some embodiments, the databases 163 are commercial cloud-based storage devices. In some embodiments, the databases 163 are housed on suitable on-premises database servers. The databases 163 of FIG. 1 are merely examples. In some embodiments, the system 100 additionally or alternatively includes other databases that store different information. In some embodiments, the databases 163 disclosed herein and/or additional or other databases are integrated with, or internal to, the infrastructure controller 156.

Although the RSM video capture device 108, the laptop 116, and the vehicle 132 are illustrated in FIG. 1 as providing example video cameras and/or microphones for use in capturing audio and/or video streams, other types of cameras and/or microphones could be used as well, including but not limited to, fixed or pivotable video cameras secured to lamp posts, automated teller machine (ATM) video cameras, other types of body worn cameras such as head-mounted cameras, other types of vehicular cameras such as roof-mounted cameras, or other types of audio and/or video recording devices accessible via a wired or wireless network interface same or similar to that disclosed herein.

For example, as depicted, the system 100 further comprises the media access computing device 169 that may be a component of the analytical computing device 162 and/or a component of the cloud compute cluster arrangement of the analytical computing device 162 and/or a standalone computing device. Either way, the media access computing device 169 is in communication with the analytical computing device 162 and/or the devices of the PAN 121 and/or the VAN 138, for example via an IP network.

The media access computing device 169 is further configured to communicate with at least one camera 173 (e.g. a closed-circuit television (CCTV) camera, a video camera, and the like) at the location of the commanding person 101 and/or the target person 102, as well as at least one optional microphone 175 and/or an optional speaker 176. The optional microphone 175 and/or the optional speaker 176 may be components of the at least one camera 173 (e.g. as depicted) and/or may be separate from the at least one camera 173. Furthermore, the at least one camera 173 (and/or the microphone 175 and/or the speaker 176) may be a component of a public safety monitoring system and/or may be a component of a commercial monitoring and/or private security system to which the computing device 169 has been provided access. The camera 173 and/or the microphone 175 generally generate one or more of video data, audio data and multimedia data associated with the location of the commanding person 101 and/or the target person 102; for example, the camera 173 may be positioned to generate video data of the location of the commanding person 101 and/or the target person 102, and the microphone 175 may be positioned to generate audio data of the location of the commanding person 101 and/or the target person 102, such as voices of the commanding person 101 and/or the target person 102 and/or ambient noise, including, but not limited to, sound 106 from the generator 105, and the like. The speaker 176 may be controlled to provide alerts and/or announcements.

Although FIG. 1 describes a communication system 100 generally as a public safety communication system that includes a commanding person 101 generally described as a police officer and a vehicle 132 generally described as a police car or cruiser, in other embodiments, the communication system 100 may additionally or alternatively be a retail communication system including a commanding person 101 that may be an employee of a retailer and a vehicle 132 that may be a vehicle for use by the commanding person 101 in furtherance of the employee's retail duties (e.g., a shuttle or self-balancing scooter). In other embodiments, the communication system 100 may additionally or alternatively be a warehouse communication system including a commanding person 101 that may be an employee of a warehouse and a vehicle 132 that may be a vehicle for use by the commanding person 101 in furtherance of the employee's retail duties (e.g., a forklift). In still further embodiments, the communication system 100 may additionally or alternatively be a private security communication system including a commanding person 101 that may be an employee of a private security company and a vehicle 132 that may be a vehicle for use by the commanding person 101 in furtherance of the private security employee's duties (e.g., a private security vehicle or motorcycle). In even further embodiments, the communication system 100 may additionally or alternatively be a medical communication system including a commanding person 101 that may be a doctor or nurse of a hospital and a vehicle 132 that may be a vehicle for use by the commanding person 101 in furtherance of the doctor or nurse's duties (e.g., a medical gurney or ambulance). In still another example embodiment, the communication system 100 may additionally or alternatively be a heavy machinery communication system including a commanding person 101 that may be a miner, driller, or extractor at a mine, oil field, or precious metal or gem field and a vehicle 132 that may be a vehicle for use by the commanding person 101 in furtherance of the miner, driller, or extractor's duties (e.g., an excavator, bulldozer, crane, front loader). As one other example, the communication system 100 may additionally or alternatively be a transportation logistics communication system including a commanding person 101 that may be a bus driver or semi-truck driver at a school or transportation company and a vehicle 132 that may be a vehicle for use by the commanding person 101 in furtherance of the driver's duties.

In the examples of the commanding person 101 being other than a police officer, certain sensors such as the weapon status sensor described above with respect to the police officer user may be replaced or supplemented with other types of sensors, such as one or more sensors that may detect whether a particular retail, warehouse, private security, heavy machinery operator, transportation driver, or other type of user has equipment necessary to perform a particular assigned or to-be-assigned task, whether such equipment is in a workable or sufficient condition, or whether the equipment is sufficient for the area or environment the user is in. Other possibilities and other variations exist as well.

One or more devices of the system 100 is generally configured to perform video and/or audio analytics on video data and/or audio data and/or multimedia received from one or more of the video camera 114, the microphone 115, the laptop 116, the smart glasses 117, the video camera 134, the microphone 135, the at least one camera 173 and/or the microphone 175.

Such video and/or audio analytics may be performed using one or more machine learning algorithms which may include, but are not limited to: a generalized linear regression algorithm; a random forest algorithm; a support vector machine algorithm; a gradient boosting regression algorithm; a decision tree algorithm; a generalized additive model; neural network algorithms, deep learning algorithms, evolutionary programming algorithms, and the like.

However, generalized linear regression algorithms, random forest algorithms, support vector machine algorithms, gradient boosting regression algorithms, decision tree algorithms, generalized additive models, and the like may be preferred over neural network algorithms, deep learning algorithms, evolutionary programming algorithms, and the like, in some public safety environments.

Figure 2:
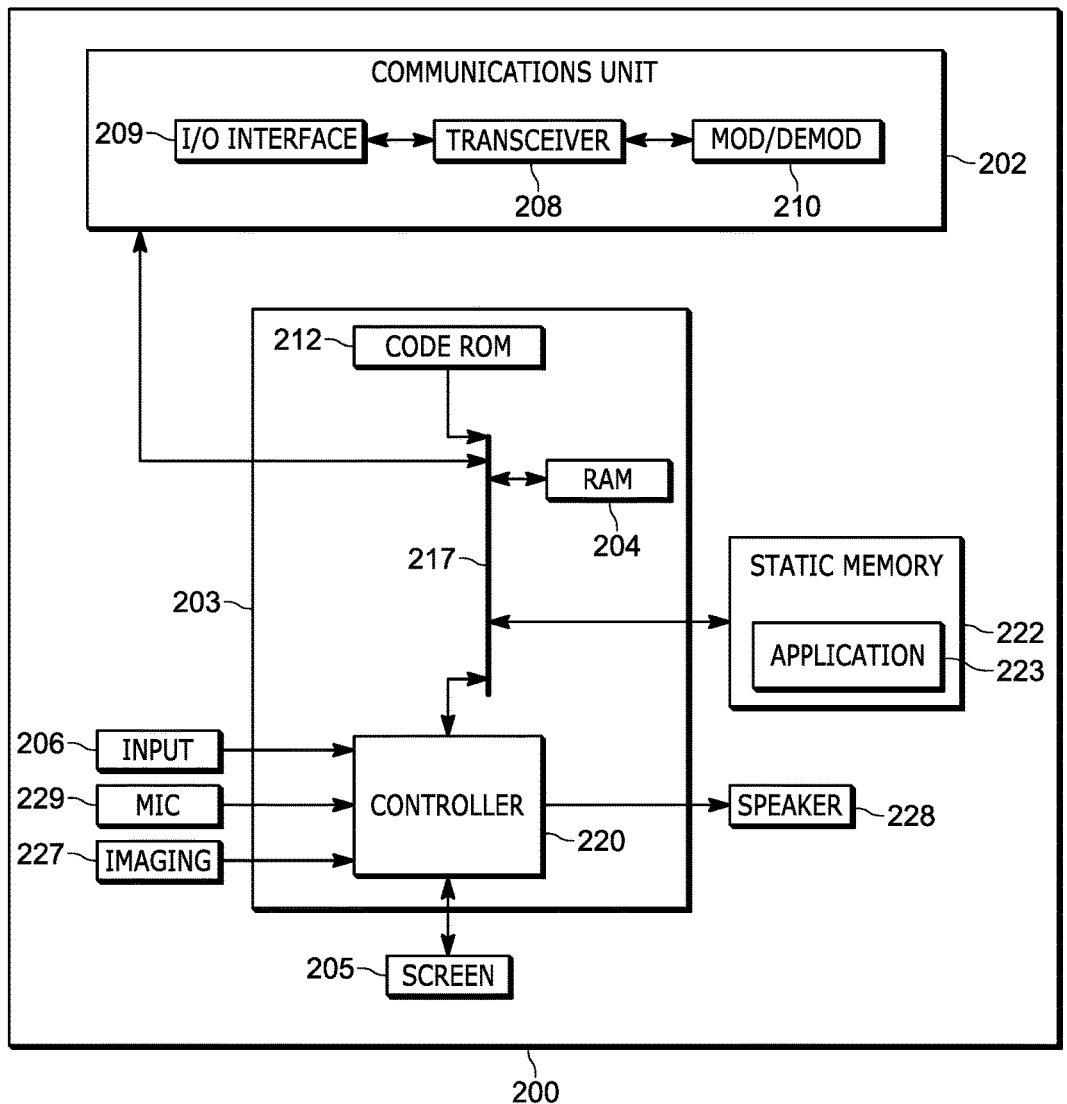
FIG. 2 is a device diagram showing a device structure of an electronic computing device for controlling a communication device to provide alerts in accordance with some embodiments.

Attention is next directed to FIG. 2 which sets forth a schematic diagram that illustrates a computing device and/or a communication device 200 (interchangeably referred to hereafter as the device 200 according to some embodiments of the present disclosure. The device 200 may be, for example, embodied in the portable radio 107, the RSM video capture device 108, the laptop 116, the mobile communication device 133, the infrastructure controller 156, the dispatch center 158, the analytical computing device 162, the media access computing device 169, or some other communication device not illustrated in FIG. 1, and/or may be a distributed computing and/or communication device across two or more of the foregoing (or multiple of a same type of one of the foregoing) and linked via a wired and/or wireless communication link(s).

As depicted, the device 200 generally includes a communications unit 202, a processing unit 203, a Random Access Memory (RAM) 204, a display screen 205, an input device 206, one or more wireless transceivers 208, one or more wired and/or wireless input/output (I/O) interfaces 209, a combined modulator/demodulator 210, a code Read Only Memory (ROM) 212, a common data and address bus 217, a controller 220, a static memory 222 storing a application 223, an imaging device 227, a speaker 228, a microphone 229.

However, while the device 200 is described with respect to including certain components, it is understood that the device 200 may be configured according to the functionality of a specific device.

Hence, while the device 200 represents the computing and/or communication devices described above with respect to FIG. 1, depending on the type of the computing and/or communication device, the device 200 may include fewer or additional components in configurations different from that illustrated in FIG. 2. For example, in some embodiments, device 200 acting as the infrastructure controller 156 and/or the analytical computing device 162 may not include one or more of the display screen 205, input device 206, microphone 229, imaging device 227, and speaker 228. As another example, in some embodiments, the device 200 acting as the portable radio 107 or the RSM video capture device 108 may further include a location determination device (for example, a global positioning system (GPS) receiver) as explained above. Other combinations are possible as well.

Furthermore, when the device 200 is configured as the portable radio 107, the device 200 may be configured communicatively coupled to other devices such as the sensor-enabled holster 118 as described above. Furthermore, in such embodiments, the combination of the portable radio 107 and the sensor-enabled holster 118 may be considered a single device 200.

The device 200 is described hereafter in further detail. As shown in FIG. 2, the device 200 includes the communications unit 202 coupled to the common data and address bus 217 of the processing unit 203. The device 200 may also include one or more input devices 206 (e.g., keypad, pointing device, touch-sensitive surface, etc.) and the display screen 205 (which, in some embodiments, may be a touch screen and thus also act as an input device 206), each coupled to be in communication with the processing unit 203.

The imaging device 227 may provide video (still or moving images) of an area in a field of view of the device 200 for further processing by the processing unit 203 and/or for further transmission by the communications unit 202. The speaker 228 may be present for reproducing audio that is decoded from voice or audio streams of calls received via the communications unit 202 from other portable radios, from digital audio stored at the device 200, from other ad-hoc or direct mode devices, and/or from an infrastructure RAN device, or may playback alert tones or other types of pre-recorded audio. The microphone 229 may be present for capturing audio from a user and/or other environmental or background audio that is further processed by the processing unit 203 in accordance with the remainder of this disclosure and/or is transmitted as voice or audio stream data, or as acoustical environment indications, by the communications unit 202 to other portable radios and/or other communication devices.

The processing unit 203 may include the code Read Only Memory (ROM) 212 coupled to the common data and address bus 217 for storing data for initializing system components. The processing unit 203 may further include the controller 220 coupled, by the common data and address bus 217, to the Random Access Memory (RAM) 204 and a static memory 222.

The communications unit 202 may include one or more wired and/or wireless input/output (I/O) interfaces 209 that are configurable to communicate with other communication devices, such as the portable radio 107, the laptop 116, the wireless RAN, and/or the mobile communication device 133.

For example, the communications unit 202 may include one or more wireless transceivers 208, such as a DMR transceiver, a P25 transceiver, a Bluetooth transceiver, a Wi-Fi transceiver, for example operating in accordance with an IEEE 802.11 standard (e.g., 802.11a, 802.11b, 802.11g), an LTE transceiver, a WiMAX transceiver, for example operating in accordance with an IEEE 802.16 standard, and/or another similar type of wireless transceiver configurable to communicate via a wireless radio network.

The communications unit 202 may additionally or alternatively include one or more wireline transceivers 208, such as an Ethernet transceiver, a USB transceiver, or similar transceiver configurable to communicate via a twisted pair wire, a coaxial cable, a fiber-optic link, or a similar physical connection to a wireline network. The transceiver 208 is also coupled to a combined modulator/demodulator 210.

The controller 220 may include ports for coupling to the display screen 205, the input device 206, the imaging device 227, the speaker 228 and/or the microphone 229.

The controller 220 includes one or more logic circuits, one or more processors, one or more microprocessors, one or more ASIC (application-specific integrated circuits) and one or more FPGA (field-programmable gate arrays), and/or another electronic device. In some embodiments, the controller 220 and/or the device 200 is not a generic controller and/or a generic device, but a device specifically configured to implement functionality for controlling a communication device to provide alerts. For example, in some embodiments, the device 200 and/or the controller 220 specifically comprises a computer executable engine configured to implement specific functionality for controlling a communication device to provide alerts.

The static memory 222 is a machine readable medium that stores machine readable instructions to implement one or more programs or applications. Example machine readable media include a non-volatile storage unit (e.g. Erasable Electronic Programmable Read Only Memory ("EEPROM"), Flash Memory) and/or a volatile storage unit (e.g. random-access memory ("RAM")). In the embodiment of FIG. 2, programming instructions (e.g., machine readable instructions) that implement the functional teachings of the device 200 as described herein are maintained, persistently, at the memory 222 and used by the controller 220 which makes appropriate utilization of volatile storage during the execution of such programming instructions.

In particular, the static memory 222 stores instructions corresponding to the application 223 that, when executed by the controller 220, enables the controller 220 to implement functionality for controlling a communication device to provide alerts. In illustrated examples, when the controller 220 executes the application 223, the controller 220 is enabled to: determine, using multimedia data received, via the communications unit 202, from one or more multimedia devices at a location of a commanding person, that an aural command has been directed from the commanding person to a target person; identify, using video data received, via the communications unit, from the one or more multimedia devices, one or more barriers to the target person hearing the aural command; determine, based on the one or more barriers that are identified using the video data, a likelihood that the target person has not heard the aural command; and when the likelihood that the target person has not heard the aural command meets a threshold condition, cause a communication device associated with the commanding person to provide an alert.

In some embodiments, an individual component and/or a combination of individual components of the system 100 may be referred to as an electronic computing device that implements an electronic digital assistant. For example, the electronic computing device may be a single electronic processor (for example, the controller 220 of the portable radio 107). In other embodiments, the electronic computing device includes multiple electronic processors distributed remotely from each other. For example, the electronic computing device may be implemented on a combination of at least two of the controller 220 of the portable radio 107, the controller 220 of the infrastructure controller 156, and the controller 220 of the analytical computing device 162 accessible via an IP network and the like.

In some embodiments, static memory 222 may also store, permanently or temporarily, a threshold level mapping indicating numerical ranges at which auditory output generated by the electronic digital assistant may be lengthened and/or shortened, a database of acronyms and their associated full terms for use in transitioning between one or the other based on a detected acoustic environment, a thesaurus database of words having similar meanings and including a syllable count for use in transitioning between them based on a detected acoustic environment, a 10-code database including the 10-code and the 10-codes associated full term meaning for use in transitioning between one or the other based on a detected acoustic environment, a contraction database setting forth contractions and the words they stand for use in transitioning between one or the other based on a detected acoustic environment, and an abbreviation database including the abbreviation and the full word that the abbreviation abbreviates for use in transitioning between one or the other based on a detected acoustic environment.

To use the electronic digital assistant implemented by the device 200, the commanding person 101 may, for example, provide an oral query or statement (which may include, but is not limited to, the aural command 103) that is received by the microphone 229 of the device 200. The device 200 receives signals representative of the oral query or statement from the microphone 229 and analyzes the signals to determine the content of the oral query or statement. For example, the electronic computing device may include a natural language processing (NLP) engine (e.g. as a component of the application 223), and/or machine learning algorithms described above, configured to determine the intent and/or content of the oral query or statement. The device 200 may also be configured to determine a response to the oral query (for example, by retrieving stored data or by requesting data from a database such as one of the databases 163) and provide the response to an output device of the device 200 (for example, one or more of the speaker 228 via a generated audio response and the display screen 205 via a generated text based response), or some other action to take in light of the content of the oral query and/or statement.

In other words, one or more of the device 200, embodied in one or more of the communication devices of FIG. 1, such as the portable radio 107, the infrastructure controller 156, and/or the analytical computing device 162, may include an NLP engine and/or one or more machine learning algorithms to analyze oral queries and/or statements received by the microphone 229 of the device 200 and provide responses to the oral queries and/or take other actions in response to the oral statements.

Although an oral query and/or statement is described above, in some embodiments, the device 200 receives and responds to other types of queries and inputs. For example, the commanding person 101 may submit a text query or statement to the device 200 by typing the text query or statement into a hard keyboard input device 206 or a soft keyboard input provided on the display screen 205 of the device 200. As another example, the commanding person 101 may use the imaging device 227 to capture an image or video of an area and press a hard or soft key to send the image or video to the electronic computing device to, for example, allow the electronic computing device to identify an object in the image or video and provide a response and/or take other actions.

Alternatively, the device 200, and/or the electronic digital assistant implemented by the device 200, may automatically perform (e.g. via execution of the application 223) video and/or audio analytics (e.g. using one or more machine learning algorithms) on video data and/or audio data and/or multimedia received from one or more of the video camera 114, the microphone 115, the laptop 116, the smart glasses 117, the video camera 134, the microphone 135, the at least one camera 173 and/or the microphone 175, as described hereafter. Put another way, the device 200 may include one or more of an audio analytics engine and a video analytics engine (e.g. as components of the application 223), which may rely on one or more machine learning algorithms.

Figure 3:
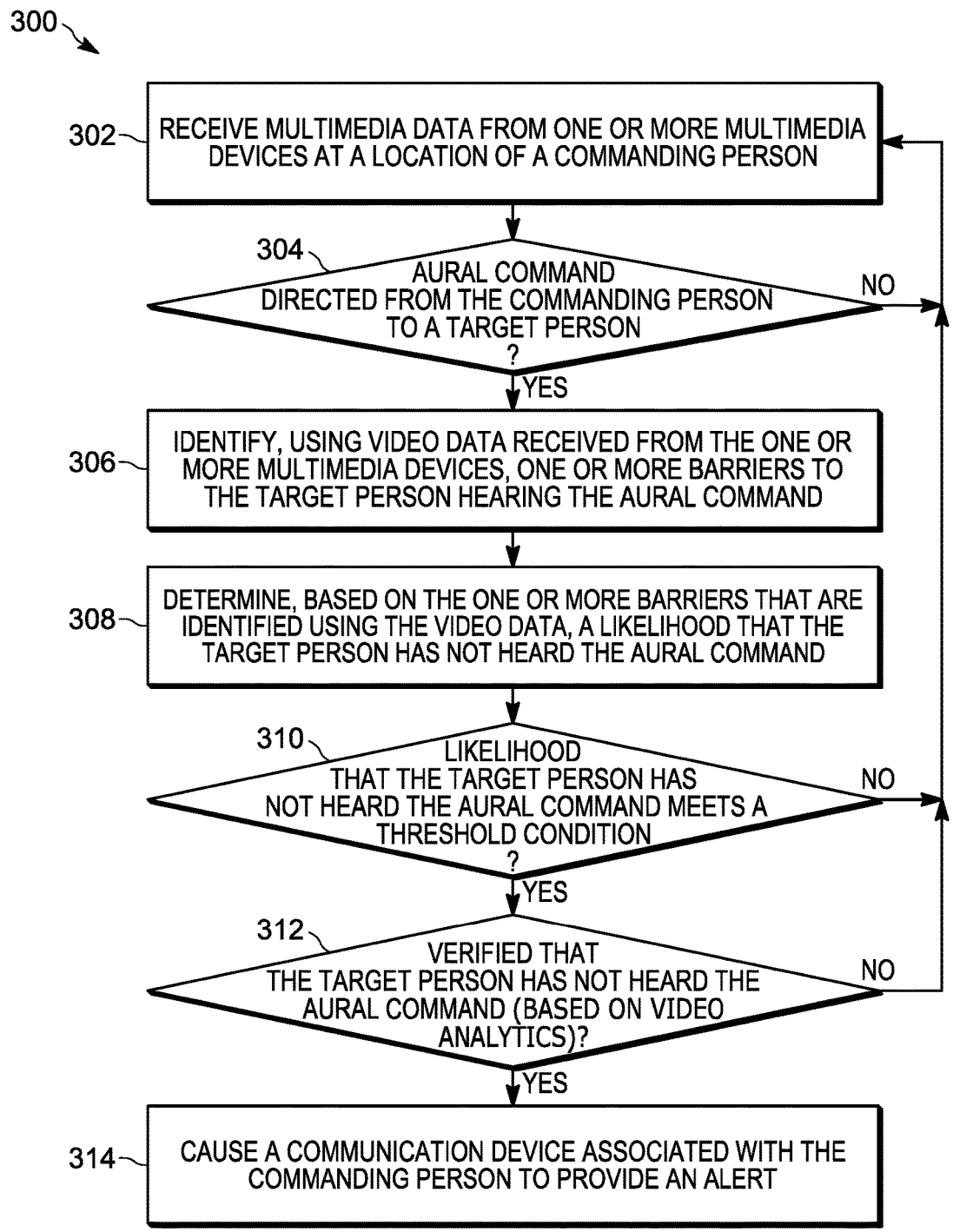
FIG. 3 is a flowchart of a method for controlling a communication device to provide alerts in accordance with some embodiments.

Attention is now directed to FIG. 3 which depicts a flowchart representative of a method 300 for controlling a communication device to provide alerts. The operations of the method 300 of FIG. 3 correspond to machine readable instructions that are executed by, for example, the device 200, and specifically by the controller 220 of the device 200. In the illustrated example, the instructions represented by the blocks of FIG. 3 are stored at the memory 222 for example, as the application 223. The method 300 of FIG. 3 is one way in which the controller 220 and/or the device 200 and/or the system 100 is configured. Furthermore, the following discussion of the method 300 of FIG. 3 will lead to a further understanding of the system 100, and its various components. However, it is to be understood that the method 300 and/or the system 100 may be varied, and need not work exactly as discussed herein in conjunction with each other, and that such variations are within the scope of present embodiments.

The method 300 of FIG. 3 need not be performed in the exact sequence as shown and likewise various blocks may be performed in parallel rather than in sequence. Accordingly, the elements of method 300 are referred to herein as "blocks" rather than "steps." The method 300 of FIG. 3 may be implemented on variations of the system 100 of FIG. 1, as well.

Furthermore, while it is assumed hereafter that the method 300 is performed at one device 200, the method 300 may be performed at one or more devices 200, for example at a combination of one or more of the portable radio 107, the infrastructure controller 156, the dispatch center 158, the analytical computing device 162, the media access computing device 169, etc.

Furthermore, the method 300 is described hereafter with respect to the commanding person 101 directing the aural command 103 to the target person 102, however the method 300 may be performed with respect to any commanding person directing any aural command to any target person.

At a block 302, the controller 220 receives multimedia data from one or more multimedia devices at a location of the commanding person 101. For example, the controller 220 may receive multimedia data from one or more of the video camera 114, the microphone 115, the laptop 116, the smart glasses 117, the video camera 134, the microphone 135, the at least one camera 173 and/or the microphone 175, which may be interchangeably and collectively referred to as multimedia devices.

At a block 304, the controller 220 determines, from the multimedia data, whether the aural command 103 is directed from the commanding person 101 to the target person 102. Such a determination may occur using one or more of audio analytics and video analytics at the controller 220. For example, the controller 220 may be configured to monitor (e.g. at a combination of the blocks 302, 304) audio data and video data (collectively referred to as multimedia data) to determine whether words spoken by the commanding person 101 includes a command and to whom that command is directed. In some implementations the controller 220 may implement natural language processing to compare words spoken by the commanding person 101 with a stored list of command words to determine whether the commanding person 101 has spoken a command; and/or the controller 220 may implement one or more machine learning algorithms to determine whether the commanding person 101 has spoken a command. Similarly, the controller 220 may implement video analytics and/or one or more machine learning algorithms to determine whether the aural command is directed from the commanding person 101 to the target person 102. For example, video data may be received which indicates that the commanding person 101 is gesturing towards and/or pointing to and/or moving towards and/or looking at the target person 102. In yet further embodiments, the audio data is received from one or more microphones which are configured to determine a direction of sound, the audio data may indicate a direction of the aural command 103.

Indeed, the block 304 may further include the controller 220 determining the target person 102 from one or more of the video data and audio data in the multimedia data based on one or more of: a direction in which the commanding person 101 is looking; a gesture of the commanding person 101; a facial expression of the commanding person 101; and content of one or more of the video data and the audio data. In other words, while present embodiments are described with respect to the target person 102 being alone, in other embodiments, the target person 102 may be with one or more or more other people and the controller 220 may determine which of the persons is the target person 102 using one or more of audio analytics and video analytics.

Hence, such audio analytics and video analytics may be components of one or more machine learning algorithms that have been "taught" to recognize aural commands and a direction thereof.

Returning to the block 304, when the controller 220 determines that the aural command 103 is not directed from the commanding person 101 to the target person 102 (a "NO" decision at the block 304), the controller 220 repeats the blocks 302, 304 until the controller 220 determines that the aural command 103 is directed from the commanding person 101 to the target person 102.

When the controller 220 determines that the aural command 103 is directed from the commanding person 101 to the target person 102 (a "YES" decision at the block 304), at a block 306, the controller 220 identifies, using video data received from the one or more multimedia devices, one or more barriers to the target person 102 hearing the aural command. For example, the video data may be extracted from the multimedia data received at the block 302 and/or further video data may be received from one or more of the multimedia devices. The video data may include images of the one or more barriers including, but not limited to, the headphones 104 worn by the target person 102, the generator 105, and the like.

Indeed, the controller 220 may be configured to "recognize" the one or more barriers in the video data using video analytics, which may be a component of one or more machine learning algorithms "taught" to recognize one or more barriers to a target person hearing an aural command. For example, the controller 220 may be configured to determine whether the target person 102 is wearing headphones and/or configured to determine machines, and the like, present in the video data, which may emit noise. Indeed, other barriers to a target person hearing an aural command are within the scope of present embodiments including, but not limited to, ear coverings (such as earmuffs, hats, and the like) dogs barking, traffic, construction equipment, sirens, water features, boomboxes, instruments, buildings/walls/architectural features between the commanding person 101 and the target person 102, and the like.

At the block 308, the controller 220 determines, based on the one or more barriers that are identified using the video data, a likelihood that the target person 102 has not heard the aural command 103. For example, the likelihood that the target person 102 has not heard the aural command 103 may comprise a number between 0% and 100%, and/or a number between 0 and 1, which may include, but is not limited to, an estimate of a probability of the target person 102 has not heard the aural command 103.

Such a likelihood may be determined using one or more machine learning algorithms applied to the video data. For example, the controller 220 and/or the device 200 may be generally configured to determine barriers to a target person hearing an aural command and the corresponding likelihood that the target person has not heard the aural command, using such machine learning algorithms.

In some embodiments, the barrier to the target person 102 hearing the aural command 103 determined from the visual data may be assigned a value, a weight, and the like, based on the type of barrier. For example, an ear covering of the target person 102 that comprises a garment (such as ear muffs) may be assigned a lower value and/or weight than an ear covering that emits sound such as the headphones 104. Similarly, a vehicle adjacent the target person 102 that is a truck with a gas engine may be assigned a higher value and/or weight than a car with a gas engine, as a truck is generally louder than car. Similarly, a vehicle with gas engine may be assigned a higher value and/or weight an electric vehicle, as a gas-powered vehicle is generally louder than an electric vehicle. Such values and/or weights may be used to determine the likelihood. Furthermore, one or more machine learning algorithms may be "taught" to determine such a likelihood from the video data.

Such a likelihood may further be based on one or more of: a loudness of the aural command 103 and loudness of ambient noise (e.g. such as the sound 106).

For example, the method 300 may further comprise the controller 220 determining, using aural data received in the multimedia data, a loudness of the aural command 103, wherein the likelihood that the target person 102 has not heard the aural command 103 is further based on the loudness of the aural command 103. Similarly, the method 300 may further comprise the controller 220 determining using ambient noise received in the multimedia data, a loudness of the ambient noise, wherein the likelihood that the target person 102 has not heard the aural command 103 is further based on the loudness of the ambient noise.

In yet further embodiments, likelihood may further be based on a combination of the loudness of the aural command 103 and the loudness of the ambient noise, for example by determining a signal-to-noise ratio (SNR) of the aural command 103 (e.g. the signal) to the ambient noise (e.g. the noise).

At a block 310, the controller 220 determines whether the likelihood that the target person 102 has not heard the aural command meets a threshold condition. For example, the threshold condition may comprise the likelihood being above a threshold likelihood and/or a threshold probability, which may be automatically and/or manually selected at the device 200 via, for example one or more machine learning algorithms and/or a menu system at the device 200.

When the likelihood that the target person 102 has not heard the aural command 103 does not meet the threshold condition (e.g. a "NO" decision at the block 310, indicating that the target person 102 has likely heard the aural command 103; for example, the likelihood may be below a threshold likelihood), the controller 220 repeats the method 300 from the block 302.

However, when the likelihood that the target person 102 has not heard the aural command 103 meets the threshold condition (e.g. a "YES" decision at the block 310, indicating that the target person 102 has likely not heard the aural command 103; for example, the likelihood may be above a threshold likelihood), at an optional block 312, the controller 220 verifies whether the target person 102 has not heard the aural command 103, based on one or more of video data and audio data received from the multimedia devices. For example, at the block 310 the controller 220 may implement one or more machine learning algorithms, as described above, to determine whether the target person has heard or not heard the aural command 103.

The controller 220, implementing such machine learning algorithms and/or video analytics and/or audio analytics, may determine that the target persons 102 has heard the aural command 103 when the target person 102 one or more of: stops, removes the headphones 104, turns towards the commanding person 101, and the like. In such example embodiments, a "NO" decision occurs at the block 312, and the controller 220 repeats the method 300 from the block 302.

Similarly, controller 220, implementing such machine learning algorithms and/or video analytics and/or audio analytics, may determine that the target persons 102 has not heard the aural command 103 when the target person 102 one or more of: does not stop, does not remove the headphones 104, does not turns towards the commanding person 101, and the like. In such example embodiments, a "YES" decision occurs at the block 312, and the controller 220, at a block 314, causes a communication device associated with the commanding person 101 to provide an alert. For example, one or more devices in the PAN 121 that is configured to provide alerts may be controlled by the controller 220 to provide an alert. Such alerts may be one or more of: graphical, textual and audible. For example, a display screen of one or more of the laptop 116, the portable radio 107, and the RSM video capture device 108 (e.g. the display screen 110) may be controlled to provide a graphical or textual alert indicating that the target person 102 has not heard the aural command 103. Similarly, the headphones 120, and/or a speaker of one or more of the laptop 116, the portable radio 107, the RSM video capture device 108 may be controlled to provide an audio alert indicating that the target person 102 has not heard the aural command 103.

Furthermore, the communication device at which the alert is provided may be one or more of the devices 200 at which the method 300 is being implemented. For example, the method 300 may be implemented at the portable radio 107 (e.g. the device 200 may comprise the portable radio 107) and the portable radio 107 may also be controlled (e.g. by the controller 220 of the portable radio 107) to provide the alert.

Attention is next directed to FIG. 4 to FIG. 11 which depict an example embodiment of the method 300. In FIG. 4 to FIG. 11 it is assumed that the controller 220 of the analytical computing device 162 is implementing the method 300. Furthermore, each of FIG. 4 to FIG. 11 is substantially similar to FIG. 1 with like elements having like numbers.

Figure 4:
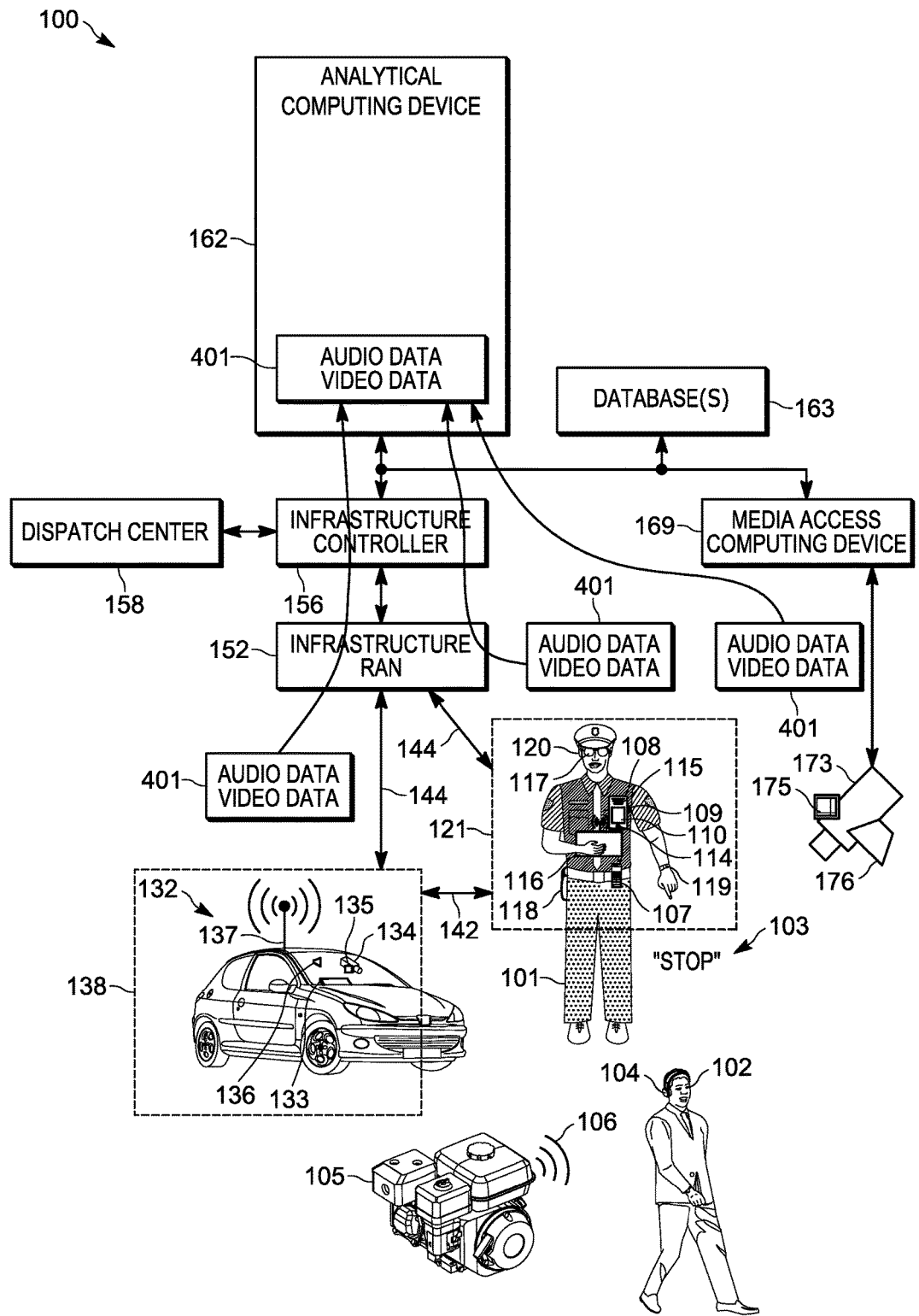
FIG. 4 depicts an analytical computing device of the system of FIG. 1 receiving multimedia data in accordance with some embodiments.

Attention is directed to FIG. 4 which depicts an example embodiment of the block 302 of the method 300. In particular, in FIG. 4, multimedia data 401 is being received at the analytical computing device 162 (and/or the controller 220 of the device 200) from each of the PAN 121, the VAN 138 and the media access computing device 169, however the multimedia data 401 may be received from one or more of the PAN 121, the VAN 138 and the media access computing device 169. The multimedia data 401 generally comprises audio data and video data from corresponding microphones and video capture devices of the PAN 121, the VAN 138 and the media access computing device 169, including, but not limited to, one or more of: the video camera 114, the microphone 115, the laptop 116, the smart glasses 117, the video camera 134, the microphone 135, the video camera 173 and the microphone 175. Furthermore, while the multimedia data 401 is depicted as including both audio data and video data, the multimedia data 401 may include only audio data or only video data. Furthermore, in some embodiments, the multimedia data 401 may be streamed to the analytical computing device 162 (or whichever device 200 is implementing the method 300).

Figure 5:
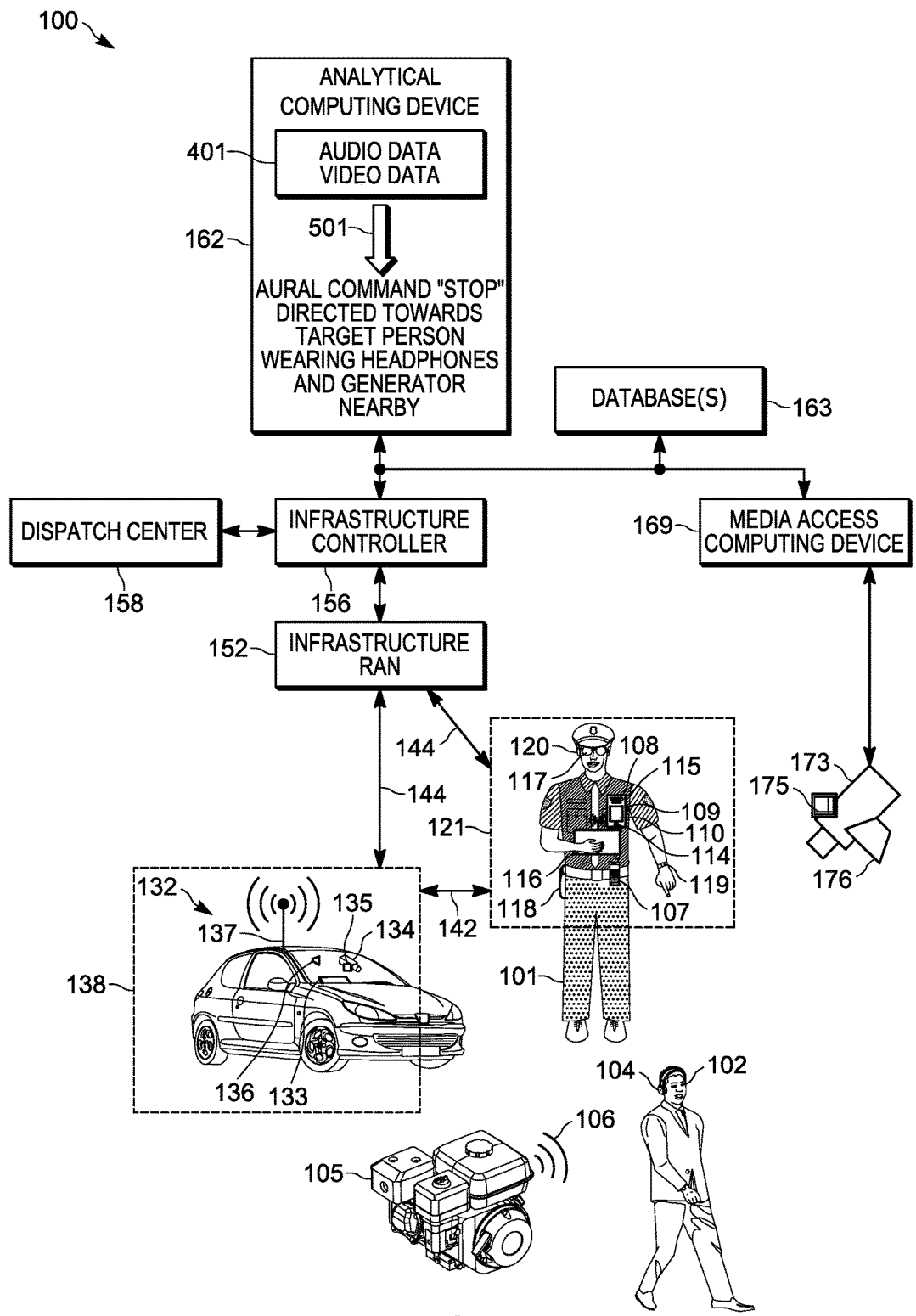
FIG. 5 depicts the analytical computing device determining that an aural command has been directed from a commanding person to a target person and further determining barriers to the target person hearing the aural command in accordance with some embodiments.

Attention is next directed to FIG. 5 which depicts an example embodiment of the block 304 and block 306 of the method 300. In particular, in FIG. 5, the analytical computing device 162 (and/or the controller 220 of the device 200) is applying one or more algorithms 501 (for example, one or more of audio analytics, video analytics and machine learning algorithms, as described above) to determine that the aural command 103 "STOP" was directed from the commanding person 101 to the target person 102 (e.g. a "YES" decision occurs at the block 304). Furthermore, in FIG. 5, the analytical computing device 162 has identified (e.g. at the block 306) barriers to the target person 102 hearing the aural command 103, and in particular the headphones 104 and the generator 105. However, when only the headphones 104 are present, the analytical computing device 162 may identify the headphones 104 but not the generator 105; similarly, when only the generator 105 are present, the analytical computing device 162 may detect the generator 105 but not the headphones 104.

Figure 6:
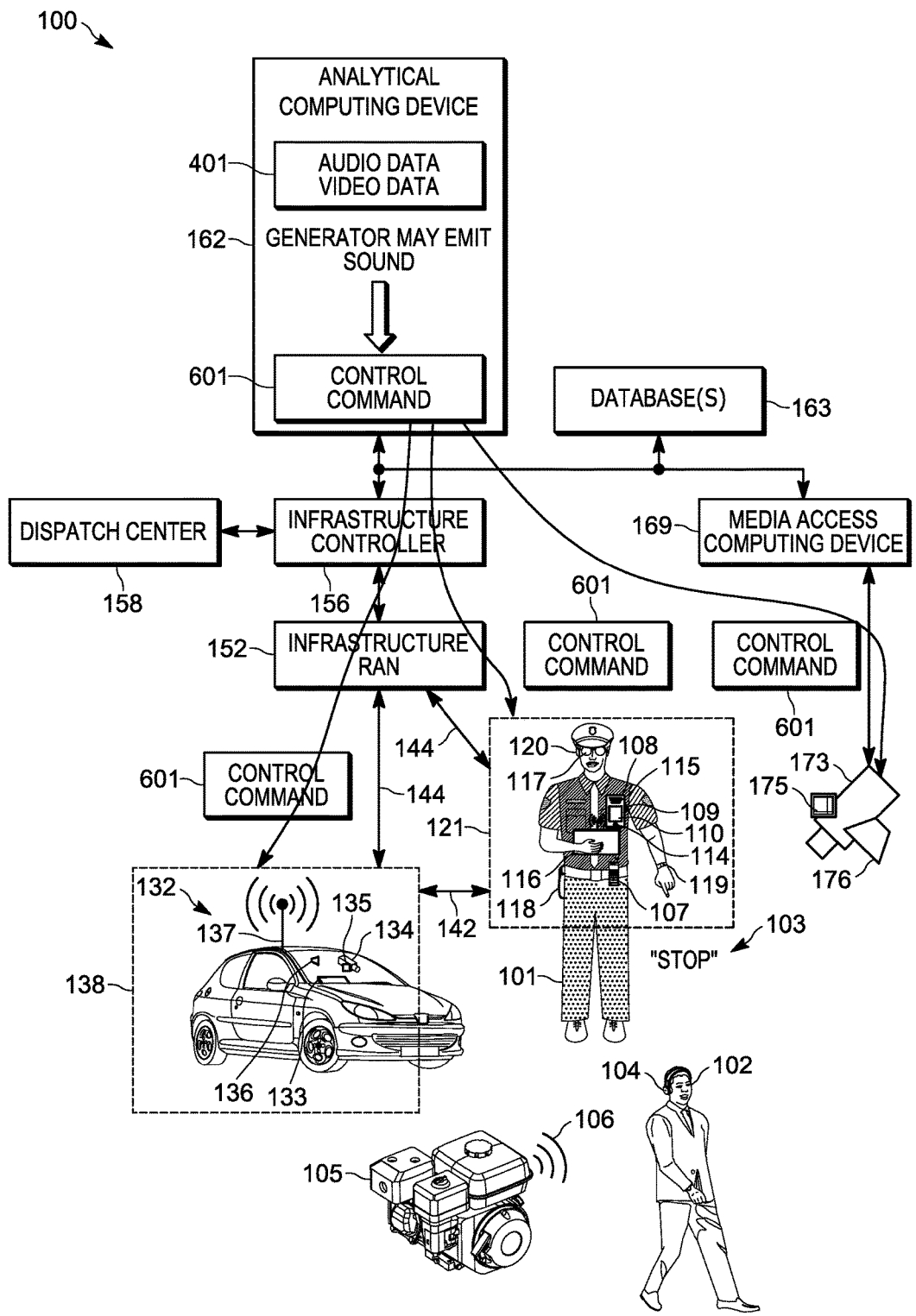
FIG. 6 depicts the analytical computing device controlling one or more microphones to measure ambient noise in accordance with some embodiments.
Figure 7:
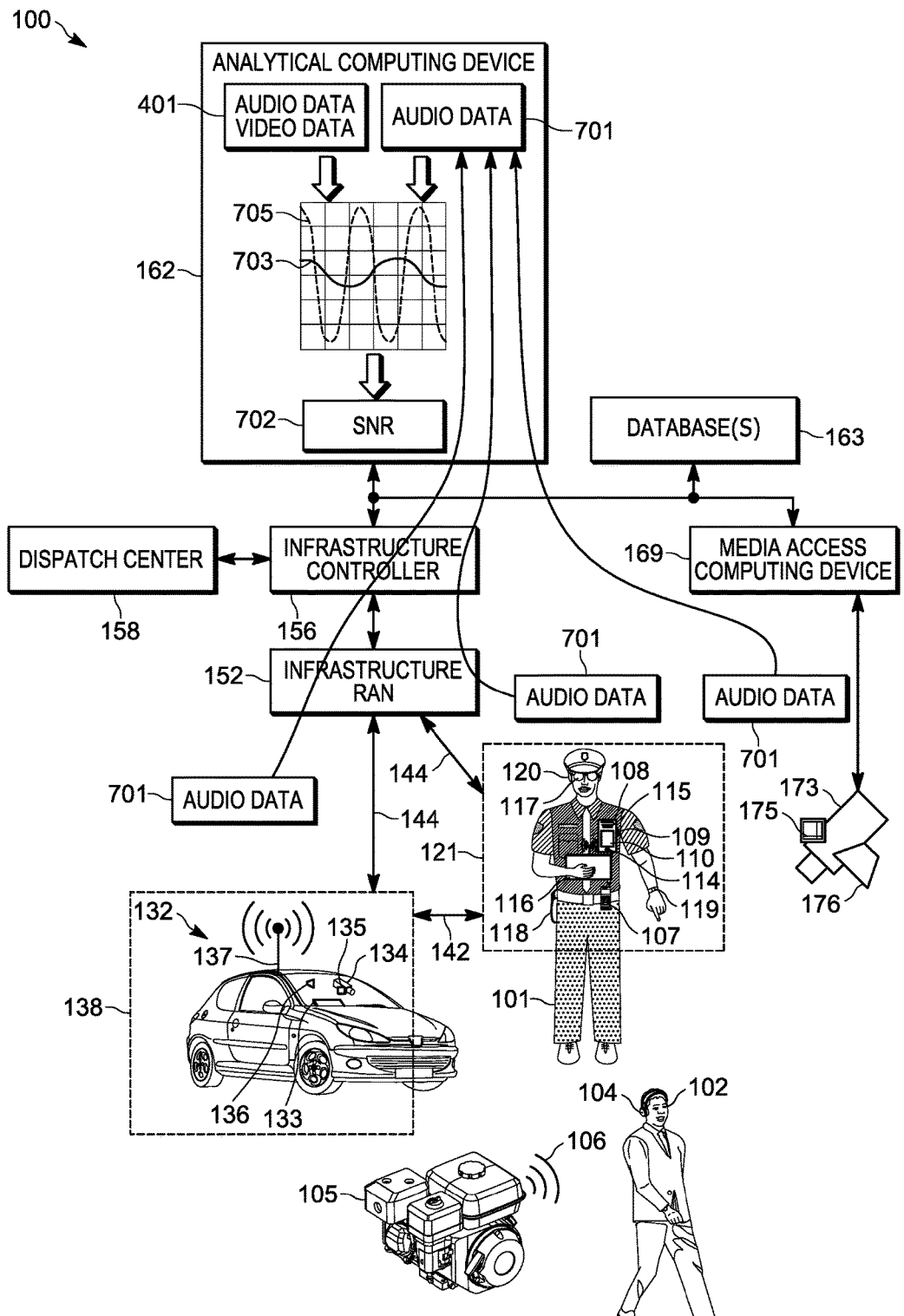
FIG. 7 depicts the analytical computing device determining a signal-to-noise ratio of the aural command in accordance with some embodiments.

Attention is next directed to FIG. 6 and FIG. 7 which depicts an example alternative embodiment of the method 300 in which the analytical computing device 162 (and/or the controller 220 of the device 200) determines, for example in conjunction with the block 306, that the one or more barriers may be emitting sound. In particular, with reference to FIG. 6, the analytical computing device 162 has determined that one of the barriers is the generator 105, which may be emitting sound, such as the sound 106. Hence, as depicted, the analytical computing device 162, in response to determining that one or more barriers may be emitting sound, controls, at least one microphone, at the location of the commanding person 101, to measure noise from the one or more barriers and/or ambient noise. Such embodiments may enable the analytical computing device 162 and/or the device 200 to better measure the ambient noise at the location of the commanding person 101.

For example, as depicted in FIG. 6, the analytical computing device 162 transmits a control command 601 to one or more of the PAN 121, the VAN 138 and the media access computing device 169 to control one or more of the microphone 115, a microphone at the laptop 116, a microphone at the smart glasses 117, the microphone 135, and the microphone 175 to measure noise.

As depicted in FIG. 7, one or more of the PAN 121, the VAN 138 and the media access computing device 169 responsively transmits audio data 701 to the analytical computing device 162, the audio data 701 representing noise as measured by one or more of the microphone 115, a microphone at the laptop 116, a microphone at the smart glasses 117, the microphone 135, and the microphone 175.

Alternatively, the analytical computing device 162 may receive the audio data 701 without transmitting the control command 601, for example in embodiments where the audio data 701 is streamed to the analytical computing device 162.

As also depicted in FIG. 7, the analytical computing device 162 may determine a signal-to-noise ratio 702 of the aural command 103, for example by comparing a loudness of the aural command 103 (e.g. represented by a noise measurement 703 of the aural command 103 as extracted, for example, from the audio data of the multimedia data 401) to a loudness of the ambient noise and/or noise from the generator 105 (or other noise-emitting barriers) as received in the audio data 701 (e.g. represented by a noise measurement 705 the audio data 701). Furthermore, the audio data 701 may be used by the analytical computing device 162 to subtract ambient noise from the audio data of the multimedia data 401 to determine the loudness of the aural command 103. While the noise measurements 703, 705 are represented in FIG. 7 by frequency curves, the noise measurements 703, 705 may each comprise a single value respectively representing a loudness of the aural command 103 and the audio data 701, for example in decibels.

Figure 8:
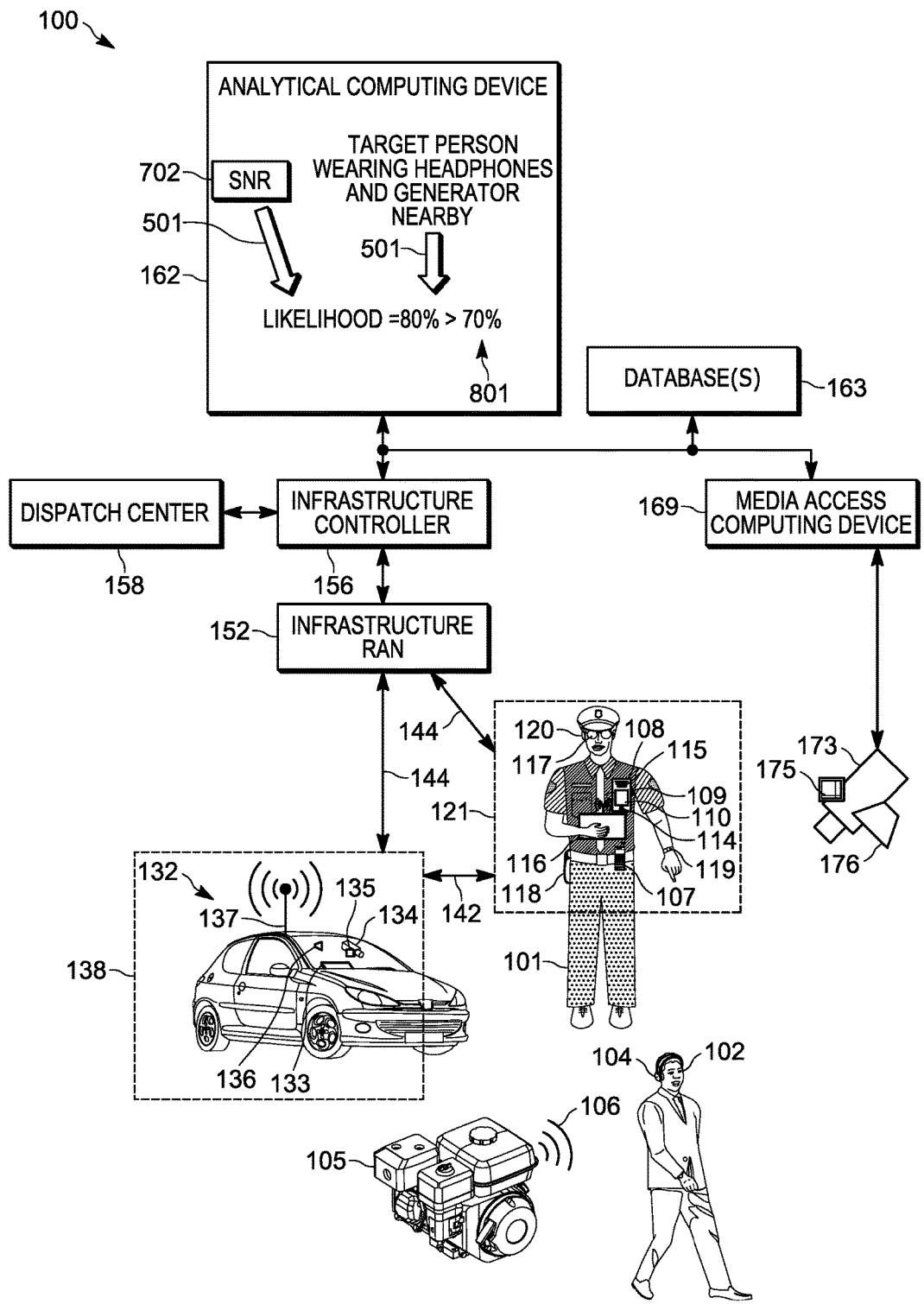
FIG. 8 depicts the analytical computing device determining a likelihood that the target person has not heard the aural command in accordance with some embodiments.

Attention is next directed to FIG. 8 which depicts an example embodiment of the block 308 and the block 310 of the method 300. In particular, in FIG. 8, the analytical computing device 162 (and/or the controller 220 of the device 200) is determining a likelihood that the target person 102 has not heard the aural command 103 using the algorithms 501, for example based on the video data in the multimedia data 401 that indicates the barriers of the target person 102 wearing the headphones 104 and the presence of the generator 105.

Alternatively, and also depicted in FIG. 8, the likelihood that the target person 102 has not heard the aural command 103 maybe be further based on the noise from the one or more barriers, for example, as depicted, as represented by the SNR 702; in yet further alternative embodiments, the likelihood that the target person 102 has not heard the aural command 103 maybe be further based on the loudness of the aural command 103 (e.g. taken alone and/or without determining the SNR 702), and/or the loudness of the ambient noise and/or the noise from the one or more barriers (e.g. taken alone and/or without determining the SNR 702). As depicted, however, the analytical computing device 162 is determining a likelihood that the target person 102 has not heard the aural command 103 using the algorithms 501 further based on the SNR 702.

As depicted, the likelihood has been determined to be value of 80% (e.g. the analytical computing device 162 has determined (based on the video data in the multimedia data 401 that indicates the barriers of the target person 102 wearing the headphones 104 and the presence of the generator 105, and the SNR 702) that there is an 80% chance that the target person 102 did not hear the aural command 103.

Furthermore, as also depicted in FIG. 8, the analytical computing device 162, at the block 310 of the method 300, compares the likelihood of 80% to a threshold value 801 of 70%. Hence, in the depicted example embodiment, the threshold condition of the block 310 comprises the likelihood determined at the block 308 being above the threshold value 801 of 70%. Hence, a "YES" decision occurs at the block 310.

Figure 9:
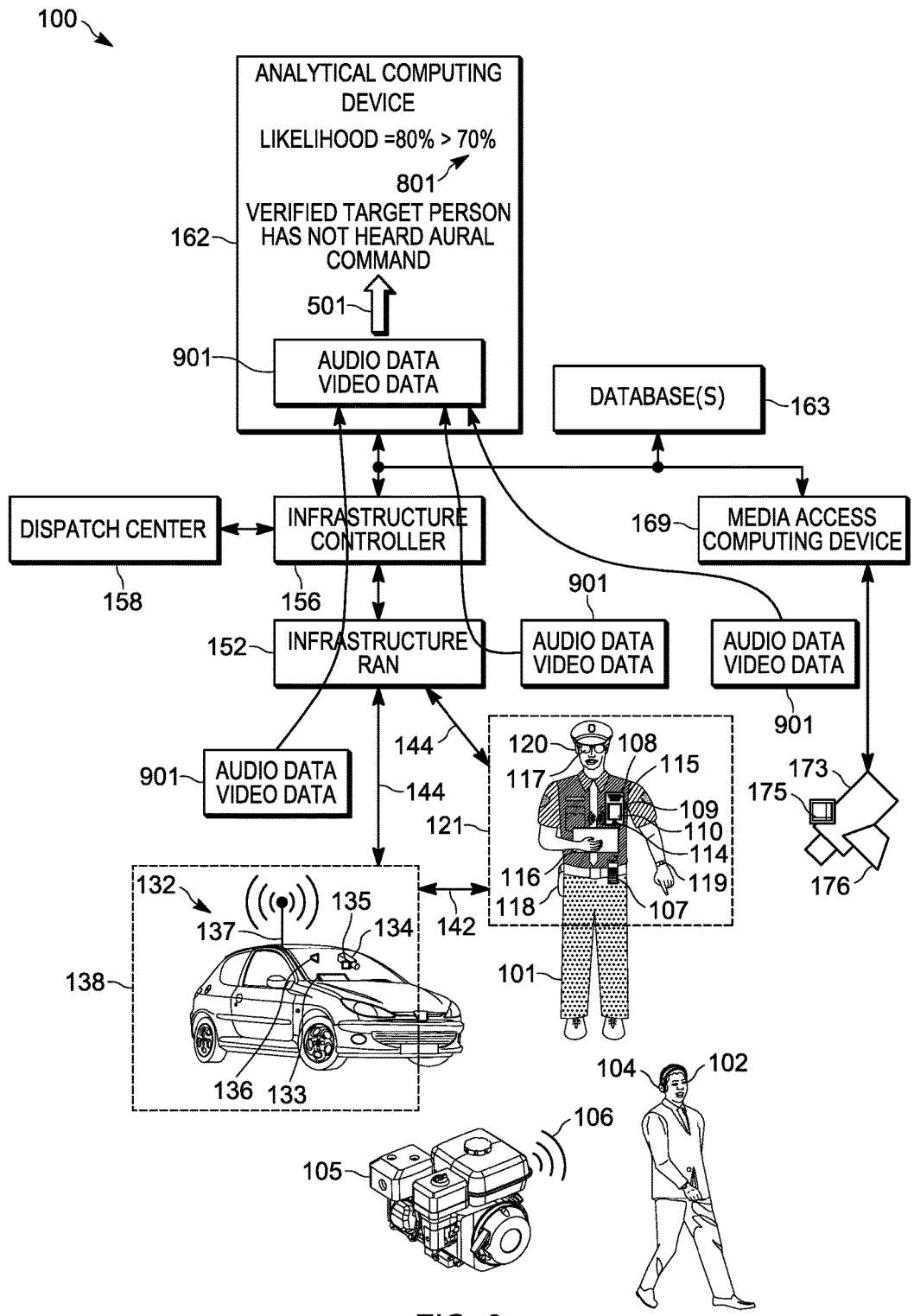
FIG. 9 depicts the analytical computing device verifying whether the target person has not heard the aural command in accordance with some embodiments.

Attention is next directed to FIG. 9 which depicts an example embodiment of the optional block 312 of the method 300. In particular, the analytical computing device 162 (and/or the controller 220 of the device 200) receives further multimedia data 901 from one or more of the PAN 121, the VAN 138 and the media access computing device 169, upon request and/or when the multimedia data 901 is streamed to the analytical computing device 162. As depicted, the analytical computing device 162 verifies, using the algorithms 501 applied to the multimedia data 901, that the target person 102 has not heard the aural command 103 (e.g. a "YES" decision occurs at the block 312 of the method 300). For example, the multimedia data 901 may indicate that the target person 102 has one or more of not stopped, not removed the headphones 104, continues to walk away from the commanding person 101, and the like.

Figure 10:
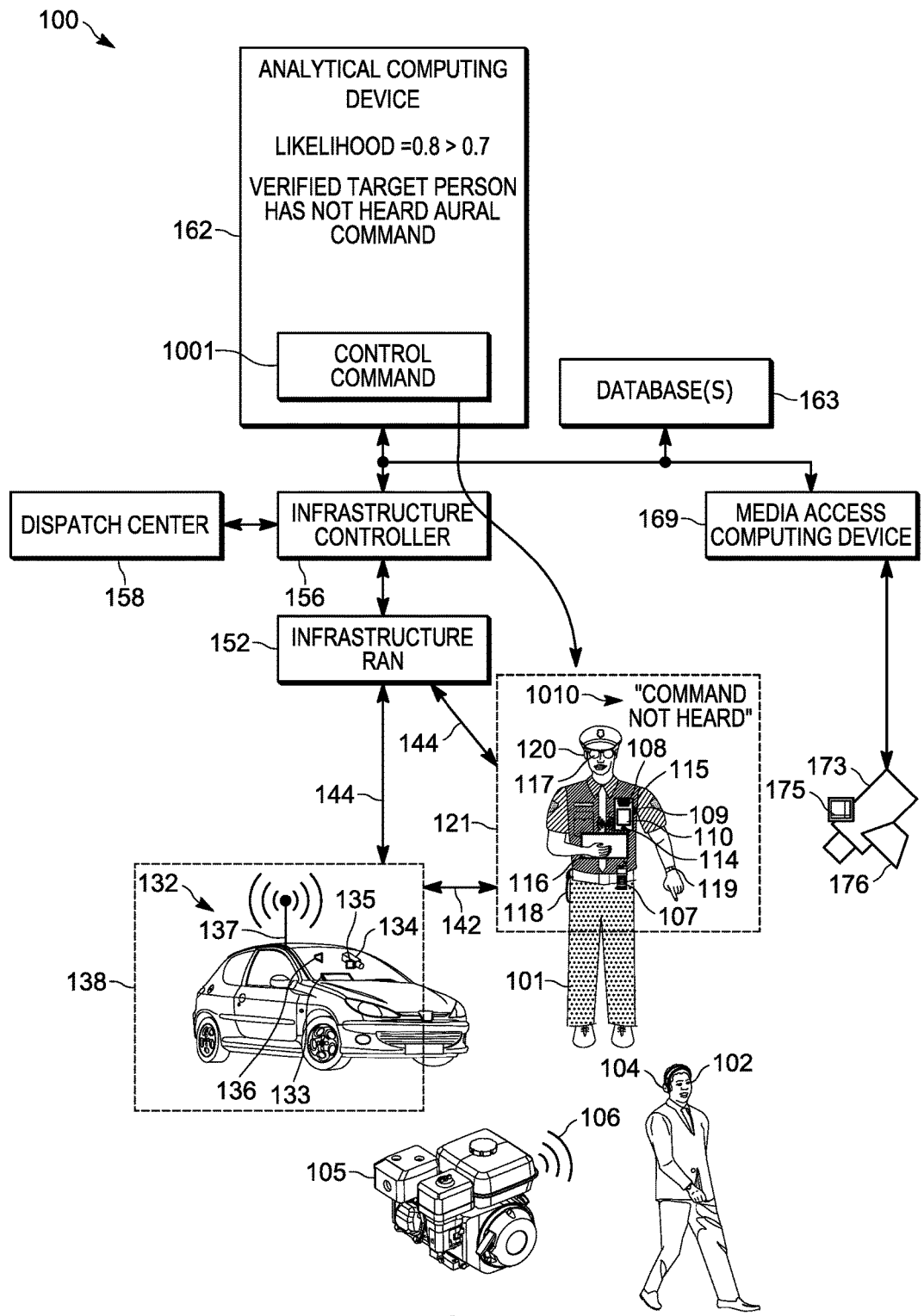
FIG. 10 depicts the analytical computing device causing a communication device associated with the commanding person to provide an alert in accordance with some embodiments.

Attention is next directed to FIG. 10 which depicts an example embodiment of the block 314 of the method 300. It is assumed in FIG. 10 that the threshold condition of the block 310 of the method 300 has been met, and that the optional verification that the target person 102 has not heard the aural command 103, of the block 312 of the method 300, has occurred. Hence, the analytical computing device 162 (and/or the controller 220 of the device 200) transmits a control command 1001 to one or more computing devices of the PAN 121 (e.g. one or more computing devices associated with the commanding person 101), which causes one or more of the computing devices of the PAN 121 to provide an alert 1010. For example, as depicted, the alert 1010 comprises audible alert emitted by a speaker of one or more of the portable radio 107, the RSM video capture device 108, the laptop 116, the smart glasses 117, and the headphones 120.

Alternatively, and/or in addition to an audible alert, the alert 1010 may comprise a visual alert rendered at a display screen of one or more of the portable radio 107, the RSM video capture device 108 (e.g. the display screen 110), the laptop 116, and the smart glasses 117. In yet further embodiments, the alert 1010 may be provided by one or more speaker (e.g. the speaker 136) and/or display screens of the VAN 138.

Figure 11:
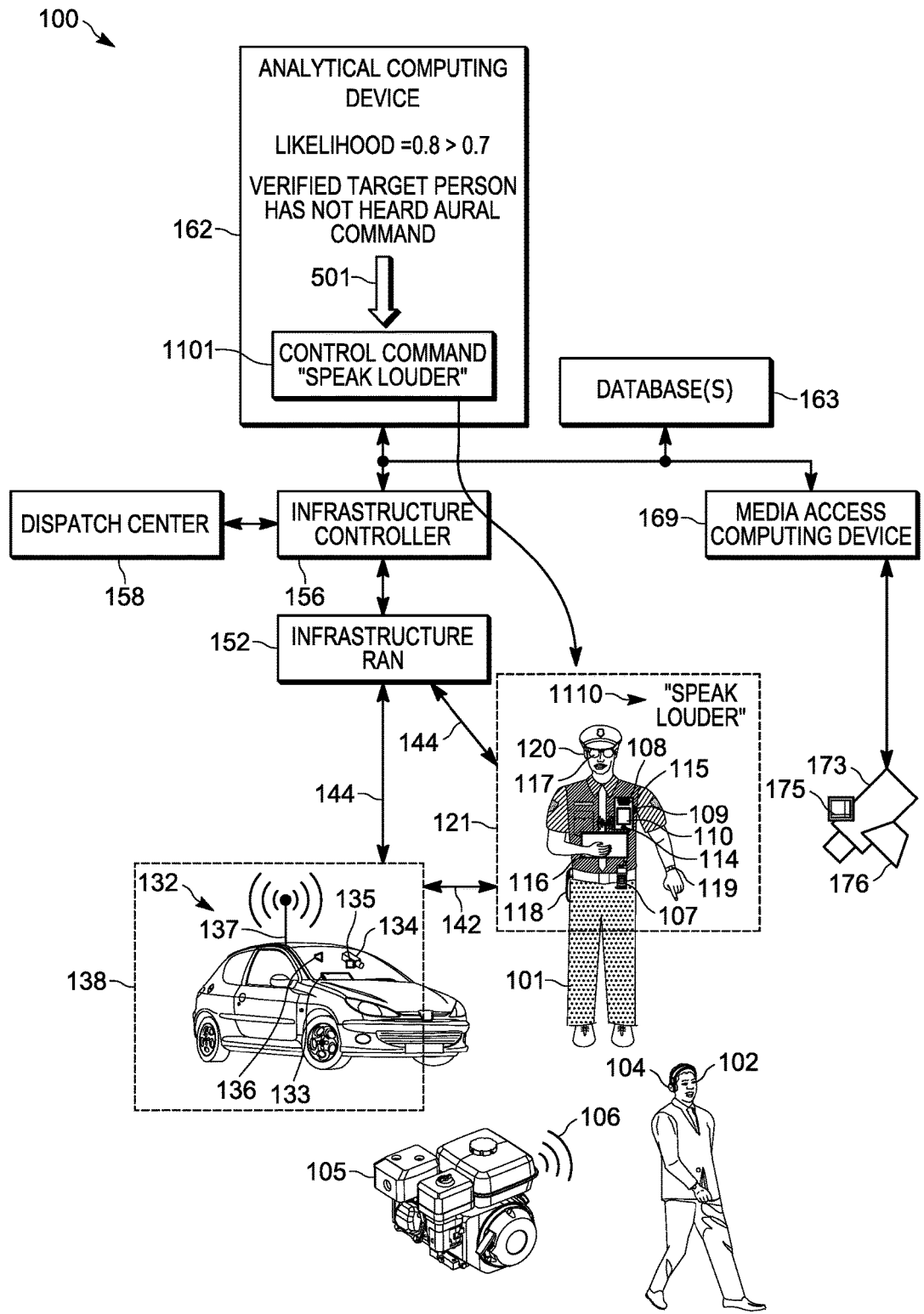
FIG. 11 depicts the analytical computing device causing a communication device associated with the commanding person to provide an alert that includes an indication of an action for improving communication with the target person in accordance with some embodiments.

Attention is next directed to FIG. 11 which depicts an example alternative embodiment of the block 314 of the method 300. FIG. 11 is substantially similar to FIG. 10, however in FIG. 10, the analytical computing device 162 (and/or the controller 220 of the device 200) determines (e.g. using the algorithms 501) an action for improving communication with the target person 102. For example, such actions may include, but are not limited to one or more of the commanding person 101: speaking louder, moving, stopping traffic, and the like. As depicted, the control command 1101 includes an indication of the action (e.g. as the text "SPEAK LOUDER"), and the control command 1101, when received by the PAN 121, causes a speaker of a device of the PAN 121 to emit an audible alert 1110 "SPEAK LOUDER", and/or the control command 1101 causes a display screen of a device of the PAN 121 to render a visual alert that includes the text "SPEAK LOUDER".

In some embodiments, the method 300 is generally performed at the device 200 in conjunction with an electronic digital assistant being implemented at the device 200 to provide assistance to the commanding person 101. In these embodiments, the electronic digital assistant may monitor aural commands being issued by the commanding person 101 and provide feedback as to whether the aural commands are heard or not heard by the target person 102.

Furthermore, the system 100 may be further configured to provide feedback to the machine learning algorithms being used to implement the method 300. For example, the outcome of one or more of the alerts 1010, 1110 may be provided to the machine learning algorithms to better "teach" the machine learning algorithms how to implement the method 300. Such feedback may be provided to the device 200 in the form of sensor data and/or audio data and/or video data from the PAN 121, the VAN 138, and the like, and/or in the form of an incident report that resulted from the commanding person 101 interacting with the target person 102. Such feedback may further include the determined likelihood of the target person 102 not hearing the aural command 103, as well as whether the target person 102 actually heard or did not hear the aural command 103, for example assuming that the commanding person 101 (or another person) interacted with the target person 102 and asked them whether they had heard the aural command 103, or not.

Such feedback may be logged in a repository, such as one or more of the databases 163, so that the data may be used as evidence of a public safety incident of the commanding person 101 interacting with the target person 102, for example for use if charges are laid against the target person 102 and/or in a court case. The feedback as logged in a repository may also be used as a source for providing the feedback to the machine learning algorithms.

Provided herein is a device, system and method for controlling a communication device to provide alerts when a target person that has not heard an aural command directed at the target person. Implementation of the method at one or more computing devices may prevent a commanding person issuing the aural command from engaging further technical resources to stop and/or interact with the target person.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

In this document, language of "at least one of X, Y, and Z" and "one or more of X, Y and Z" may be construed as X only, Y only, Z only, or any combination of two or more items X, Y, and Z (e.g., XYZ, XY, YZ, ZZ, and the like). Similar logic may be applied for two or more items in any occurrence of "at least one . . . " and "one or more . . . " language.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A method comprising:
   determining, at one or more computing devices, using multimedia data received from one or more multimedia devices at a location of a commanding person, that an aural command has been directed from the commanding person to a target person;
   identifying, at the one or more computing devices, using video data received from the one or more multimedia devices, one or more barriers to the target person hearing the aural command;
   determining, at the one or more computing devices, based on the one or more barriers that are identified using the video data, a likelihood that the target person has not heard the aural command; and
   when the likelihood that the target person has not heard the aural command meets a threshold condition, causing, via the one or more computing devices, a communication device associated with the commanding person to provide an alert.

2. The method of claim 1, further comprising:
   extracting the video data from the multimedia data.

3. The method of claim 1, further comprising:
   determining, at the one or more computing devices, using aural data received in the multimedia data, a loudness of the aural command, wherein the likelihood that the target person has not heard the aural command is further based on the loudness of the aural command.

4. The method of claim 1, further comprising:
   determining, at the one or more computing devices, using ambient noise received in the multimedia data, a loudness of the ambient noise, wherein the likelihood that the target person has not heard the aural command is further based on the loudness of the ambient noise.

5. The method of claim 1, further comprising:
   determining that the one or more barriers may be emitting sound; and
   in response, controlling, via the one or more computing devices, a microphone, at the location, to measure noise from the one or more barriers, wherein the likelihood that the target person has not heard the aural command is further based on the noise from the one or more barriers.

6. The method of claim 1, further comprising:
   verifying, at the one or more computing devices, using the video data, that the target person has not heard the aural command; and
   causing, via the one or more computing devices, the communication device associated with the commanding person to provide the alert only when both: the likelihood meets the threshold condition; and verification that the target person has not heard the aural command occurs.

7. The method of claim 1, further comprising:
   determining an action for improving communication with the target person; and
   including an indication of the action in the alert.

8. The method of claim 1, further comprising:
   determining the target person from one or more of the video data and audio data in the multimedia data based on one or more of:
   a direction in which the commanding person is looking;
   a gesture of the commanding person;
   a facial expression of the commanding person; and
   content of one or more of the video data and the audio data.

9. The method of claim 1, wherein the identifying, based on the video data received from one or more multimedia devices, the one or more barriers occurs using a video analytics engine.

10. The method of claim 1, wherein the determining the aural command has been directed from the commanding person to the target person occurs using one or more of a video analytics engine and an audio analytics engine.

11. A device comprising:
    a controller communicatively coupled to a communications unit, the controller configured to:
    determine, using multimedia data received, via the communications unit, from one or more multimedia devices at a location of a commanding person, that an aural command has been directed from the commanding person to a target person;
    identify, using video data received, via the communications unit, from the one or more multimedia devices, one or more barriers to the target person hearing the aural command;
    determine, based on the one or more barriers that are identified using the video data, a likelihood that the target person has not heard the aural command; and
    when the likelihood that the target person has not heard the aural command meets a threshold condition, cause a communication device associated with the commanding person to provide an alert.

12. The device of claim 11, wherein the controller is further configured to:
    extract the video data from the multimedia data.

13. The device of claim 11, wherein the controller is further configured to:
    determine, using aural data received in the multimedia data, a loudness of the aural command, wherein the likelihood that the target person has not heard the aural command is further based on the loudness of the aural command.

14. The device of claim 11, wherein the controller is further configured to:
    determine, using ambient noise received in the multimedia data, a loudness of the ambient noise, wherein the likelihood that the target person has not heard the aural command is further based on the loudness of the ambient noise.

15. The device of claim 11, wherein the controller is further configured to:
    determine that the one or more barriers may be emitting sound; and
    in response, control a microphone, at the location, to measure noise from the one or more barriers, wherein the likelihood that the target person has not heard the aural command is further based on the noise from the one or more barriers.

16. The device of claim 11, wherein the controller is further configured to:
    verify, using the video data, that the target person has not heard the aural command; and
    cause the communication device associated with the commanding person to provide the alert only when both: the likelihood meets the threshold condition; and verification that the target person has not heard the aural command occurs.

17. The device of claim 11, wherein the controller is further configured to:
- determine an action for improving communication with the target person; and
- include an indication of the action in the alert.

18. The device of claim 11, wherein the controller is further configured to:
- determine the target person from one or more of the video data and audio data in the multimedia data based on one or more of:
- a direction in which the commanding person is looking;
- a gesture of the commanding person;
- a facial expression of the commanding person; and
- content of one or more of the video data and the audio data.

19. The device of claim 11, wherein the controller is further configured to:
- identify, based on the video data received from one or more multimedia devices, the one or more barriers occurs using a video analytics engine.

20. The device of claim 11, wherein the controller is further configured to:
- determine the aural command has been directed from the commanding person to the target person occurs using one or more of a video analytics engine and an audio analytics engine.

* * * * *